(12) United States Patent
Yorimoto

(10) Patent No.: US 8,599,667 B2
(45) Date of Patent: Dec. 3, 2013

(54) MULTI-LAYER RECORDABLE OPTICAL DISK, RECORDING DEVICE, AND RECORDING METHOD

(75) Inventor: Kenji Yorimoto, Kanagawa (JP)

(73) Assignee: Sony Corporation (JP)

( * ) Notice: Subject to any disclaimer, the term of this patent is extended or adjusted under 35 U.S.C. 154(b) by 295 days.

(21) Appl. No.: 12/930,736

(22) Filed: Jan. 14, 2011

(65) Prior Publication Data

US 2011/0176399 A1  Jul. 21, 2011

(30) Foreign Application Priority Data

Jan. 21, 2010  (JP) ................ P2010-010597

(51) Int. Cl.
*G11B 7/26* (2006.01)
*G11B 20/10* (2006.01)
*G11B 19/00* (2006.01)

(52) U.S. Cl.
USPC ............ 369/53.17; 369/13.4; 369/275.3; 369/280; 369/44.33; 369/47.14; 369/53.15; 369/30.04; 369/30.07

(58) Field of Classification Search
USPC ............ 369/30.03, 30.05, 30.07–30.11, 273, 369/275.3, 280, 283, 284–286, 13.4, 13.39, 369/13.42, 47.14, 47.22, 47.31, 47.39, 369/47.47, 47.55, 53.12, 53.17, 53.24, 369/53.45, 44.32, 44.33, 53.15
See application file for complete search history.

(56) References Cited

U.S. PATENT DOCUMENTS

| 2005/0174902 | A1 | 8/2005 | Fujita | |
| 2007/0070843 | A1* | 3/2007 | Kobayashi | 369/47.36 |
| 2009/0092013 | A1* | 4/2009 | Nishimura | 369/47.14 |
| 2010/0014395 | A1* | 1/2010 | Kuroda et al. | 369/47.15 |
| 2011/0194393 | A1* | 8/2011 | Akimoto et al. | 369/47.53 |
| 2011/0305126 | A1* | 12/2011 | Hwang et al. | 369/47.14 |

FOREIGN PATENT DOCUMENTS

| EP | 0715301 A2 | 6/1996 |
| EP | 1768125 A1 | 3/2007 |
| JP | 2009-093690 A | 4/2009 |

OTHER PUBLICATIONS

European Search Report EP 10196753, dated May 2, 2011.

* cited by examiner

*Primary Examiner* — Wayne Young
*Assistant Examiner* — Dionne Pendleton
(74) *Attorney, Agent, or Firm* — Lerner, David, Littenberg, Krumholz & Mentlik, LLP

(57) ABSTRACT

Disclosed herein is a multi-layer optical recording medium having n recording layers (n≥3) in which recording and reproduction of information are carried out by laser light, the multi-layer optical recording medium including: a file system area configured to be disposed near a last logical address in an area used as a logical address space in which stream data is recorded, wherein in the other recording layers different from the recording layer in which the file system area near the last logical address is disposed, the logical address space is not allocated to an area overlapping with the file system area in a layer stacking direction.

12 Claims, 20 Drawing Sheets

F I G. 2

DMA

| CLUSTER NUMBER | CONTENTS | THE NUMBER OF CLUSTERS |
|---|---|---|
| 1-4 | DDS(SAME CONTENTS ARE REPEATED FOUR TIMES) | 4 |
| 5-8 | DFL#1 | 4 |
| 9-12 | DFL#2(SAME CONTENTS AS #1) | 4 |
| 13-16 | DFL#3(SAME CONTENTS AS #1) | 4 |
| 17-20 | DFL#4(SAME CONTENTS AS #1) | 4 |
| 21-24 | DFL#5(SAME CONTENTS AS #1) | 4 |
| 25-28 | DFL#6(SAME CONTENTS AS #1) | 4 |
| 29-32 | DFL#7(SAME CONTENTS AS #1) | 4 |

32 CLUSTERS

FIG. 3

DDS(DISK DEFINITION STRUCTURE)

| BYTE POSITION | CONTENTS | THE NUMBER OF BYTES |
|---|---|---|
| 0 | DDS IDENTIFIER = "DS" | 2 |
| 2 | DDS FORMAT NUMBER | 1 |
| 3 | RESERVE (00h) | 1 |
| 4 | THE NUMBER OF TIMES OF DDS UPDATING (=LAST TDDS SERIAL NUMBER) | 4 |
| 8 | RESERVE (00h) | 8 |
| 16 | STARTING PHYSICAL SECTOR ADDRESS OF DRIVE AREA IN DMA(AD_DRV) | 4 |
| 20 | RESERVE (00h) | 4 |
| 24 | STARTING PHYSICAL SECTOR ADDRESS OF DEFECT LIST IN DMA(AD_DFL) | 4 |
| 28 | RESERVE (00h) | 4 |
| 32 | STARTING PHYSICAL SECTOR ADDRESS OF USER DATA AREA | 4 |
| 36 | ENDING LOGICAL SECTOR ADDRESS OF USER DATA AREA | 4 |
| 40 | INNER CIRCUMFERENCE SPARE AREA SIZE | 4 |
| 44 | OUTER CIRCUMFERENCE SPARE AREA SIZE | 4 |
| 48 | LAST SPARE AREA SIZE | 4 |
| 52 | ALTERNATION AREA AVAILABILITY FLAG | 1 |
| 53 | RESERVE (00h) | 65483 |

1 CLUSTER (65536 BYTES)

FIG.4

DFL(DEFECT LIST)

| BYTE POSITION | CONTENTS | THE NUMBER OF BYTES |
|---|---|---|
| 0 | DEFECT LIST MANAGEMENT INFORMATION | 64 |
| 64 | ALTERNATION ADDRESS INFORMATION ati#1 | 8 |
| 72 | ALTERNATION ADDRESS INFORMATION ati#2 | 8 |
| ... | ... | ... |
| | ALTERNATION ADDRESS INFORMATION ati#N | 8 |
| 64+8×N | ALTERNATION ADDRESS INFORMATION TERMINATION | 8 |
| | 00h | |
| | 00h | |

← 4 CLUSTERS →

FIG. 5

DEFECT LIST MANAGEMENT INFORMATION OF DFL/TDFL

| BYTE NUMBER | CONTENTS | THE NUMBER OF BYTES |
|---|---|---|
| 0 | DFL IDENTIFIER = "DL" | 2 |
| 2 | DFL FORMAT NUMBER | 1 |
| 3 | RESERVE (00h) | 1 |
| 4 | THE NUMBER OF TIMES OF DFL UPDATING | 4 |
| 8 | RESERVE (00h) | 4 |
| 12 | THE NUMBER OF REGISTERED ENTRIES IN DFL(N_DFL) | 4 |
| 16 | RESERVE (00h) | 8 |
| 24 | THE NUMBER OF UNRECORDED CLUSTERS IN ISA/OSA | 4 |
| 28 | RESERVE (00h) | 36 |

64 BYTES

FIG. 7

TEMPORARY DMA(TDMA)

| CLUSTER NUMBER | CONTENTS | THE NUMBER OF CLUSTERS |
|---|---|---|
| 1 | SPACE BITMAP FOR LAYER0 | 1 |
| 2 | SPACE BITMAP FOR LAYER1 | 1 |
| 3 | TEMPORARY DEFECT LIST(TDFL) | 1~4 |
| ... | ... | ... |
| 2048 | | |

← 2048 CLUSTERS →

FIG. 9

TDFL(TEMPORARY DEFECT LIST)

| BYTE POSITION | CONTENTS | NUMBER OF BYTES |
|---|---|---|
| 0 | DEFECT LIST MANAGEMENT INFORMATION | 64 |
| 64 | ALTERNATION ADDRESS INFORMATION ati#1 | 8 |
| 72 | ALTERNATION ADDRESS INFORMATION ati#2 | 8 |
| ... | ... | ... |
| | ALTERNATION ADDRESS INFORMATION ati#N | 8 |
| 64+8×N | ALTERNATION ADDRESS INFORMATION TERMINATION | 8 |
| | 00h | |
| ... | ... | ... |
| 65536×N−2048 | TEMPORARY DDS(TDDS) | 2048 |

1 TO 4 CLUSTERS

FIG.10

TDDS(TEMPORARY DISK DEFINITION STRUCTURE)

| BYTE POSITION | CONTENTS | THE NUMBER OF BYTES |
|---|---|---|
| 0 | DDS IDENTIFIER = "DS" | 2 |
| 2 | DDS FORMAT NUMBER | 1 |
| 3 | RESERVE (00h) | 1 |
| 4 | TDDS SERIAL NUMBER | 4 |
| 8 | RESERVE (00h) | 8 |
| 16 | STARTING PHYSICAL SECTOR ADDRESS OF DRIVE AREA IN TDMA(AD_DRV) | 4 |
| 20 | RESERVE (00h) | 4 |
| 24 | STARTING PHYSICAL SECTOR ADDRESS OF TEMPORARY DEFECT LIST IN TDMA(AD_DFL) | 4 |
| 28 | RESERVE (00h) | 4 |
| 32 | STARTING PHYSICAL SECTOR ADDRESS OF USER DATA AREA | 4 |
| 36 | ENDING LOGICAL SECTOR ADDRESS OF USER DATA AREA | 4 |
| 40 | INNER CIRCUMFERENCE SPARE AREA SIZE | 4 |
| 44 | OUTER CIRCUMFERENCE SPARE AREA SIZE | 4 |
| 48 | LAST SPARE AREA SIZE | 4 |
| 52 | ALTERNATION AREA AVAILABILITY FLAG | 1 |
| 53 | RESERVE (00h) | 971 |
| 1024 | PHYSICAL SECTOR ADDRESS OF LAST RECORDING OF USER DATA (LRA) | 4 |
| 1028 | STARTING PHYSICAL SECTOR ADDRESS OF LATEST SPACE BITMAP (FIRST LAYER)IN TDMA (AD_BP0) | 4 |
| 1032 | STARTING PHYSICAL SECTOR ADDRESS OF LATEST SPACE BITMAP (SECOND LAYER)IN TDMA (AD_BP1) | 4 |
| 1036 | OVERWRITING FUNCTION AVAILABILITY FLAG (1:AVAILABLE) | 1 |
| 1037 | RESERVE (00h) | 1011 |

1 SECTOR (2048 BYTES)

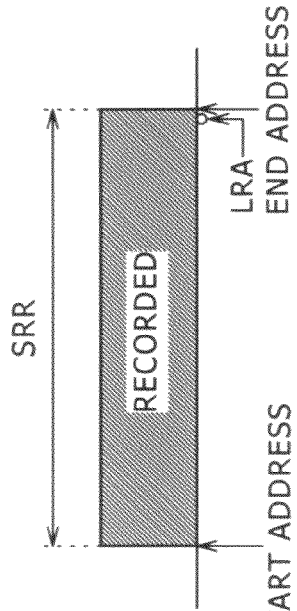
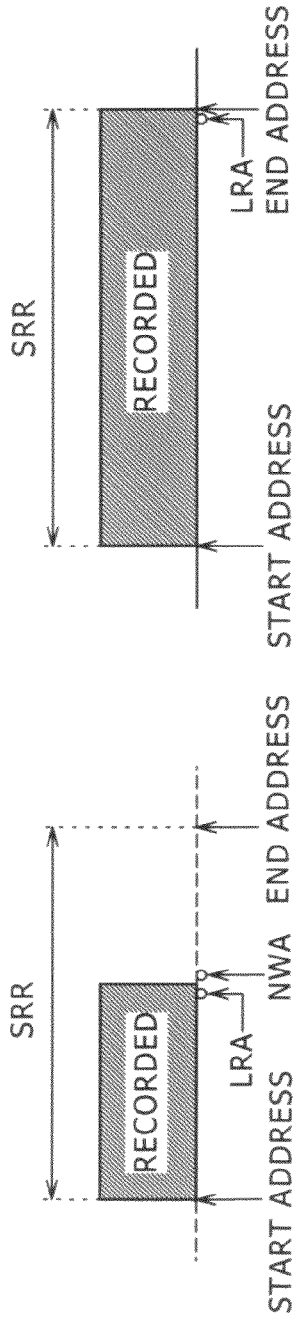
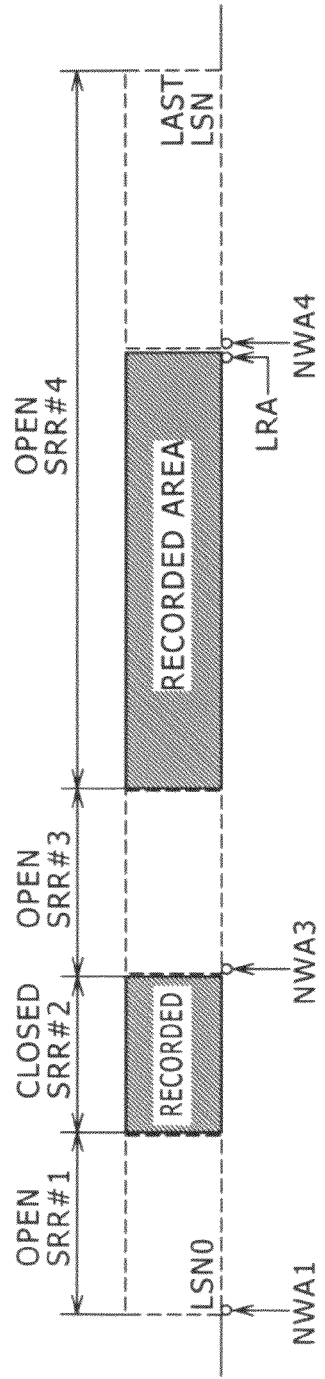

FIG.12

SRRI(SEQUENTIAL RECORDING RANGE INFORMATION)

| RELATIVE DATA FRAME NUMBER | BYTE POSITION IN DATA FRAME | CONTENTS | THE NUMBER OF BYTES |
|---|---|---|---|
| 31-M | 0 | SRRI HEADER | 64 |
| 31-M | 64 | LIST OF SRR ENTRIES | N_SRR×8 |
| ⋮ | ⋮ | ⋮ | ⋮ |
| 30 | 64+(N_SRR×8) | SRRI TERMINATOR | 8 |
| | 64+(N_SRR+1)×8 | RESERVE (00h) | |
| (31) | | (TDDS) | |

M: THE NUMBER OF SECTORS CONFIGURING SRRI
N_SRR: THE NUMBER OF SRR ENTRIES

FIG. 13A

SRRI HEADER

| RELATIVE DATA FRAME NUMBER | BYTE POSITION IN DATA FRAME | CONTENTS | THE NUMBER OF BYTES |
|---|---|---|---|
| 31-M | 0 | SRRI IDENTIFIER="SR" | 2 |
| 31-M | 2 | SRRI FORMAT=00h | 1 |
| 31-M | 3 | RESERVED(00h) | 1 |
| 31-M | 4 | SRRI UPDATE COUNT | 4 |
| 31-M | 8 | RESERVED(00h) | 4 |
| 31-M | 12 | NUMBER OF SRR ENTRIES | 4 |
| 31-M | 16 | NUMBER OF OPEN SRRs | 1 |
| 31-M | 17 | RESERVED(00h) | 3 |
| 31-M | 20 | LIST OF OPEN SRR NUMBERS | 16×2 |
| 31-M | 52 | RESERVED(00h) | 12 |

M: THE NUMBER OF SECTORS CONFIGURING SRRI

FIG. 13B

LIST OF OPEN SRR NUMBERS

| RELATIVE DATA FRAME NUMBER | BYTE POSITION IN DATA FRAME | CONTENTS | THE NUMBER OF BYTES |
|---|---|---|---|
| 31-M | 20 | 1ST OPEN SRR NUMBER | 2 |
| 31-M | 22 | 2ND OPEN SRR NUMBER | 2 |
| 31-M | | ⋮ | ⋮ |
| 31-M | 50 | 16TH OPEN SRR NUMBER | 2 |

MULTI-LAYER RECORDABLE OPTICAL DISK, RECORDING DEVICE, AND RECORDING METHOD

CROSS-REFERENCE TO RELATED APPLICATION

The present application claims priority from Japanese Patent Application No. JP 2010-010597 filed in the Japanese Patent Office on Jan. 21, 2010, the entire content of which is incorporated herein by reference.

BACKGROUND OF THE INVENTION

1. Field of the Invention

The present invention relates to a multi-layer optical recording medium having three or more recording layers as a recordable optical disk such as a write-once disk and a rewritable disk, a recording device capable of dealing with the multi-layer optical recording medium, and a recording method.

Japanese Patent Laid-open No. 2009-93690 is one example of related-art documents.

2. Description of the Related Art

Optical recording media such as the Blu-ray Disc (registered trademark) are known. In the optical recording media, recording and reproduction of information by use of a semiconductor laser are performed. As the Blu-ray Disc, a write-once disk (Blu-ray Disc Recordable (BD-R)), a rewritable disk (Blu-ray Disc Rewritable (BD-RE)), and so forth are known.

For the recording media such as the optical disks, increase in the recording capacity thereof is always required. For example, in the case of the Blu-ray Disc, it is envisaged that further increase in the number of recording layers will be advanced for a triple-layer structure and a quadruple-layer structure and significant increase in the capacity will be realized. Also for the BD-R and the BD-RE, increase in the capacity of data recording by the user is being promoted through increase in the number of recording layers.

SUMMARY OF THE INVENTION

In particular in the multi-layer optical recording media as the BD-R, the BD-RE, and so forth, a problem often occurs if the number of recording layers is three or more.

With reference to FIGS. 20A and 20B, this problem will be described below by examples of the case of a triple-layer disk and a quadruple-layer disk of the BD-R and the BD-RE. FIGS. 20A and 20B show the structure of the data zone in the Blu-ray Disc along its radial direction. The data zone is the area in which mainly user data are recorded as described later with FIG. 1.

FIG. 20A shows an example of a triple-layer disk in which recording layers L0, L1, and L2 are formed.

From the viewpoint of the laser incidence side, the recording layer L0 is formed at the remotest position, and the recording layers L1 and L2 are disposed in that order toward the closest side.

In the recording layers L0, L1, and L2, the area on the inner circumference side in the data zone is used as ISA0, ISA1, and ISA2, respectively. The ISA is an inner spare area (inner circumference side alternation area) and is used for alternation processing for a defect and so forth.

The areas on the outer circumference side of the recording layers L0, L1, and L2 are used as OSA0, OSA1, and OSA2. The OSA is an outer spare area (outer circumference side alternation area), and it is also an area used for alternation processing for a defect and so forth. In this case, the OSA2 serves as the last alternation area LSA (last spare area).

In each of the recording layers L0, L1, and L2, the area between the ISA and the OSA is used as the logical address space, and user data are recorded therein. The logical address space is the area to which the logical address (logical sector number LSN) is allocated.

The position of the first logical address (FirstLSN) forming the logical address space is immediately after the ISA0 in the recording layer L0. The position of the last logical address (LastLSN) is immediately before the OSA2 (LSA) in the recording layer L2.

A predetermined leg from the first logical address is the area in which a file system FS is recorded.

A predetermined leg to the last logical address is also the area in which the file system FS is recorded.

In the data zone, mainly stream data such as video stream data are recorded as user data. As shown by an arrowhead RS, in the recording layer L0, the recording of stream data is performed along the direction from the position immediately after the file system FS toward the outer circumference side. Next, in the recording layer L1, the recording is performed along the direction from the part immediately before the OSA1 toward the inner circumference side. Furthermore, in the recording layer L2, the recording is performed along the direction from the position immediately after the ISA2 toward the outer circumference side.

Points to remember about the multi-layer optical recording media such as the Blu-ray Disc will be described below.

In general, the multi-layer optical disks are so designed that the best recording quality is achieved when writing is performed in the order of the recording layer L0→L1→L2 . . . . In contrast, for example if writing is performed in the recording layer L1 or a subsequent recording layer and thereafter recording is performed at the same radial position in a recording layer of a younger number, the recording quality tends to be low. In particular, this tendency is stronger in the write-once media.

Furthermore, the file system needs to be surely recorded near the last logical address LastLSN.

Verify processing is executed in recording of the file system. Therefore, even when the recording quality is low, this state is recovered by alternation processing. However, the verify processing is not executed in recording of stream data, and therefore it is very important to maintain high recording quality in stream data recording.

Referring to FIG. 20A in consideration of these points, in this triple-layer disk, the situation of "recording in the recording layer L2 followed by writing at the same radial position in L0/L1" possibly occurs near the outer circumference of the recording layers L0 and L1. Specifically, the file system is written as shown in the diagram in initialization processing. Thereafter, in the range indicated by an area W in the recording layers L0 and L1, stream data is recorded in the state in which the laser light passes through the writing-completed area (file system area) in the recording layer L2. In this case, the possibility that the recording quality is low in this area W is high, and the possibility that the recorded data cannot be read from this area W later is also high.

Furthermore, alternation processing is not executed because of stream data recording. Therefore, the possibility that the stream data as the recording target is lost is also high.

FIG. 20B shows the case of a quadruple-layer disk. Also in the case of the quadruple-layer disk, in the respective recording layers L0, L1, L2, and L3, the ISA (ISA0, ISA1, ISA2, and ISA3) is provided on the inner circumference side. Furthermore, the OSA (OSA0, OSA1, OSA2, and OSA3) is provided on the outer circumference side.

In the respective recording layers L0, L1, L2, and L3, stream data recording is performed along the direction of the arrowhead RS. Therefore, the last logical address is at the position on the outer circumference side of the ISA3 of the recording layer L3. The file system FS is recorded near the first logical address (FirstLSN) and the last logical address (LastLSN).

A similar event occurs also in this quadruple-layer disk. In the range indicated by the area W in the recording layers L1 and L2, stream data is recorded in the state in which the laser light passes through the writing-completed area (file system area) in the recording layer L3. Therefore, the possibility that the recording quality is low in this area W and the recorded data cannot be read from this area W later is high. Possibly the stream data is lost as a result.

Such a problem is not particularly envisaged in the case of the double-layer disk.

In the case of the double-layer disk, the recording layers L0 and L3 in FIG. 20B can be considered as the recording layers L0 and L1 of this double-layer disk. In this case, the area overlapping with the recorded area of the file system FS near the last logical address is the recorded area of the file system FS near the first logical address in the recording layer L0, and is not the area in which stream data area recorded. Thus, the above-described problem does not occur.

There is a need for the present invention to avoid the occurrence of the problem described with FIGS. 20A and 20B in a recording medium having three or more layers in particular.

According to the first embodiment of the present invention, there is provided a multi-layer optical recording medium having n recording layers (n≥3) in which recording and reproduction of information are carried out by laser light, the multi-layer optical recording medium including: a file system area configured to be disposed near a last logical address in an area used as a logical address space in which stream data is recorded. In the multi-layer optical recording medium, in the other recording layers different from the recording layer in which the file system area near the last logical address is disposed, the logical address space is not allocated to an area overlapping with the file system area in a layer stacking direction.

In the multi-layer optical recording medium of the embodiment, an alternation area may be formed physically adjacent to the area used as the logical address space in each of the recording layers, and the alternation area may be disposed as the areas in the other recording layers overlapping with the file system area in the layer stacking direction.

In the multi-layer optical recording medium of the embodiment, size of the alternation areas in the other recording layers may be set larger than at least a total of size of the alternation area adjacent to the last logical address and size of the file system area, to thereby dispose the alternation area as the areas in the other recording layers overlapping with the file system area in the layer stacking direction.

In the multi-layer optical recording medium of the embodiment, a first recording layer may be formed at a remotest position from a viewpoint of a laser light incident surface side, and the recording layers from a second recording layer to an n-th recording layer may be so formed as to be sequentially closer to the laser light incident surface side, and the logical address space may be formed as an area from a first logical address in the first recording layer to the last logical address in the n-th recording layer.

According to another embodiment of the present invention, there is provided a recording device for a multi-layer optical recording medium having n recording layers (n≥3) in which recording and reproduction of information are carried out by laser light, the recording device including: a recorder configured to carry out information recording by irradiating the recording layers of the multi-layer optical recording medium with laser light; and a controller configured to execute processing of making the recorder record, in the multi-layer optical recording medium, management information for setting size of an alternation area adjacent to a last logical address and size of alternation areas in the other recording layers overlapping with the alternation area adjacent to the last logical address in a layer stacking direction in such a manner that the size of the alternation areas in the other recording layers is set larger than at least a total of the size of the alternation area adjacent to the last logical address and size of a file system area formed near the last logical address in setting of the alternation areas adjacent to an area used as a logical address space in the recording layers as physical formatting processing for the multi-layer optical recording medium.

In the recording device according to the embodiment, the controller may make the recorder form a file system area near a first logical address of the logical address space and near the last logical address as file system initialization after the physical formatting, to thereby allow the alternation areas in the other recording layers to overlap with the file system area near the last logical address in the layer stacking direction.

In the recording device according to the embodiment, the controller may control the recorder so that stream data is recorded in the area used as the logical address space in the multi-layer optical recording medium after the file system initialization.

According to further embodiment of the present invention, there is provided a recording device for a multi-layer optical recording medium having n recording layers (n≥3) to which the physical formatting has been carried out, the recording device including: a recorder configured to carry out information recording by irradiating the recording layers of the multi-layer optical recording medium with laser light; and a controller configured to execute processing of making the recorder form a file system area near a first logical address of a logical address space and near a last logical address as file system initialization for the multi-layer optical recording medium in which size of an alternation area adjacent to the last logical address and size of alternation areas in the other recording layers overlapping with the alternation area adjacent to the last logical address in a layer stacking direction are set in such a manner that the size of the alternation areas in the other recording layers is set larger than at least a total of the size of the alternation area adjacent to the last logical address and size of the file system area formed near the last logical address in setting of the alternation areas adjacent to an area used as the logical address space in the recording layers as physical formatting processing for the multi-layer optical recording medium, to thereby allow the alternation areas in the other recording layers to overlap with the file system area near the last logical address in the layer stacking direction.

According to still further embodiment of the present invention, there is provided a recording method for a multi-layer optical recording medium having n recording layers (n≥3) in which recording and reproduction of information are carried out by laser light. The recording method sets size of an alternation area adjacent to a last logical address and size of alternation areas in the other recording layers overlapping with the alternation area adjacent to the last logical address in a layer stacking direction in such a manner that the size of the alternation areas in the other recording layers is set larger than at least a total of the size of the alternation area adjacent to the last logical address and size of a file system area formed near the last logical address in setting of the alternation areas adjacent to an area used as a logical address space in the recording layers at a stage of physical formatting for the multi-layer optical recording medium. Next, the method forms a file system area near a first logical address of the logical address space and near the last logical address as file system initialization after the physical formatting, to thereby allow the alternation areas in the other recording layers to overlap with the file system area near the last logical address in the layer stacking direction. Then, the method records stream data in the area used as the logical address space in the multi-layer optical recording medium after the file system initialization.

That is, in the embodiments of the present invention, in the multi-layer optical recording medium having three or more layers, the logical address space is not allocated to the areas overlapping with the file system area near the last logical address in the layer stacking direction in the recording layers other than the recording layer in which the file system area near the last logical address is disposed. This feature prevents stream data recording by laser light that has passed through the area in which the file system is recorded.

Furthermore, specifically, physical formatting and file system initialization are carried out before stream data recording. In this case, setting of the alternation areas (ISA: inner spare area, OSA: outer spare area, LSA: last spare area) in the physical formatting is devised to thereby prevent the logical address space from being disposed as the area overlapping with the file system area in the layer stacking direction.

The embodiments of the present invention can avoid stream data recording by laser light that has passed through the file system area in a multi-layer optical recording medium having three or more layers. This provides an advantageous effect that the reliability of stream data recording can be enhanced.

BRIEF DESCRIPTION OF THE DRAWINGS

FIG. 2 is an explanatory diagram of a DMA in the disk of the embodiment;

FIG. 3 is an explanatory diagram of the contents of a DDS in the disk of the embodiment;

FIG. 4 is an explanatory diagram of the contents of a DFL in the disk of the embodiment;

FIG. 5 is an explanatory diagram of defect list management information in the DFL and a TDFL in the disk of the embodiment;

FIG. 7 is an explanatory diagram of a TDMA in the disk of the embodiment;

FIG. 9 is an explanatory diagram of the TDFL in the disk of the embodiment;

FIG. 10 is an explanatory diagram of a TDDS in the disk of the embodiment;

FIGS. 11A to 11C are explanatory diagrams of SRR in the disk of the embodiment;

FIG. 12 is an explanatory diagram of SRRI in the disk of the embodiment;

FIGS. 13A and 13B are explanatory diagrams of an SRRI header in the disk of the embodiment;

DETAILED DESCRIPTION OF THE PREFERRED EMBODIMENT

An embodiment of the present invention will be described below in the following order as exemplified by Blu-ray Disc and a disk drive device (recording/reproduction device) thereof.

[1. Disk Structure]
[2. DMA]
[3. TDMA]
[4. SRR and SRRI]
[5. Alternation Processing by Use of Alternation Area]
[6. Multi-Layer Disk Structure]
[7. Disk Drive Device]
[8. Recording Layer Structure of Embodiment]
[9. Modification Example]

[1. Disk Structure]

First, the outline of an optical disk of the embodiment will be described. This optical disk can be implemented as a write-once disk (BD-R) or a rewritable disk (BD-RE) in the category of a high-density optical disk system referred to as the so-called Blu-ray Disc.

One example of the physical parameters of the high-density optical disk of the present embodiment will be described.

As the disk size of the optical disk of the present example, the diameter is 120 mm and the disk thickness is 1.2 mm. That is, from these points, this optical disk is the same as a disk of the compact disc (CD) system and a disk of the digital versatile disc (DVD) system in terms of the external form.

A so-called blue laser is used as the laser for recording/reproduction, and a high NA (e.g. 0.85) is set for the optical system. Furthermore, a narrow track pitch (e.g. 0.32 μm) and high linear density (e.g. the recording linear density is 0.12 μm/bit) are realized. Based on these features, about 23 to 25 gigabytes (GB) is realized as the user data capacity in the 12-cm-diameter disk. Furthermore, it is considered that capacity of about 30 GB is also permitted by higher-density recording.

In addition, a so-called multi-layer disk having plural recording layers has also been developed. In the multi-layer disk, the user data capacity is multiplied by the number of layers substantially. Incidentally, a recording layer will also be called simply as a layer.

Figure 1:
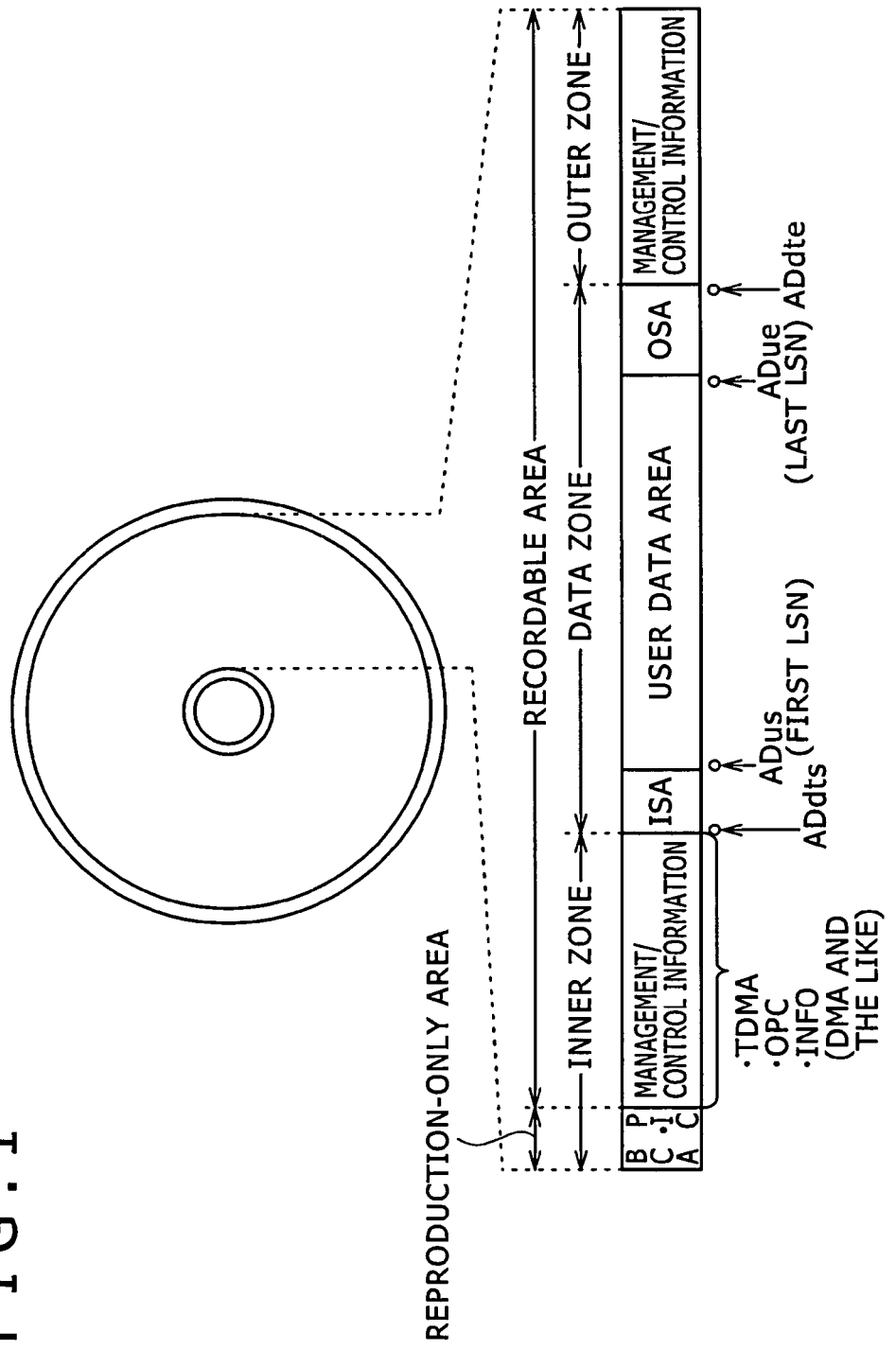
FIG. 1 is an explanatory diagram of the area structure of a disk according to an embodiment of the present invention.

FIG. 1 shows the layout (area configuration) of the entire disk.

As the areas on the disk, the inner zone, the data zone, and the outer zone are disposed from the inner circumference side.

In FIG. 1, the disk is shown with a structure including one recording layer (single-layer structure). In this case, the inner zone serves as the lead-in area, and the outer zone serves as the lead-out area.

The disk of the embodiment is a triple-layer disk, a quadruple-layer disk or a multi-layer disk having more layers as described later. In this disk, the inner zone of the first layer (layer L0) serves as the lead-in area. Finally, any of the outer zone of the first layer (layer L0) and the subsequent zones (the inner zones and the outer zones of layers L1, L2, and L3) is employed as the lead-out area depending on user data capacity recorded thereon.

For convenience of description, the inner circumference side areas of the respective recording layers, including the lead-in area of the first layer (layer L0), will be referred to collectively as the inner zone. Furthermore, the outer circumference side areas of the respective recording layers will be referred to collectively as the outer zone.

In terms of the area configuration relating to recording and reproduction, the area on the innermost circumference side, of the inner zone (lead-in area), is used as the reproduction-only area, and the area from the middle of the inner zone to the end of the outer zone is used as the recordable area.

In the reproduction-only area, a burst cutting area (BCA) and PIC (pre-recorded information area) are provided. However, in the inner zone structure of a multi-layer disk having two or more layers, the PIC is provided only in the first layer (layer L0) and the part of the same radius as that of the PIC serves as the recordable area in the second layer (layer L1) and the subsequent recording layers.

In the recordable area in the inner zone, OPC, TDMA, INFO (including DMA and so forth), etc., which will be described later, are formed for recording of management/control information and so forth.

In the reproduction-only area and the recordable area, the recording track based on a wobbling groove (serpentine trench) is formed into a spiral shape. The groove is used as the guide of the tracking in tracing by a laser spot, and data recording/reproduction is performed with this groove used as the recording track.

The present example is based on the assumption of an optical disk in which data is recorded in the groove. However, the embodiment of the present invention is not limited to an optical disk of such a groove recording system but may be applied to an optical disk of a land recording system, in which data is recorded in the land between the grooves. Furthermore, it can be applied also to an optical disk of a land-and-groove recording system, in which data is recorded in the groove and the land.

The groove used as the recording track has a serpentine shape corresponding to a wobble signal. Therefore, in a disk drive device for the optical disk, the wobble signal can be reproduced by detecting both edge positions of the groove from reflected light of the laser spot emitted onto the groove and extracting a fluctuation component of both edge positions in the disk radial direction while the laser spot is moved along the recording track.

In this wobble signal, address information (physical address, other pieces of additional information, etc.) of the recording track at the recording position thereof is modulated. Thus, in the disk drive device, address control and so forth in data recording/reproduction can be carried out by demodulating the address information and so forth from this wobble signal.

The inner zone shown in FIG. 1 is the area inside the position of radius 24 mm for example.

In the PIC (pre-recorded information area) in the inner zone, disk information such as the recording and reproduction power conditions, information on the areas on the disk, information used for copy protection, etc. are recorded in advance as reproduction-only information by the wobbling of the groove. In the PIC, e.g. the disk type, the disk size, the disk version, the layer structure, the channel bit length, BCA information, the transfer rate, data zone position information, the recording linear velocity, and information on the recording/reproduction laser power are recorded as well. These pieces of information may be recorded by embossed pits or the like.

The BCA is provided closer to the inner circumference than the PIC. The BCA is made by recording the unique ID specific to the disk recording medium by e.g. a recording system of burning out the recording layer. Specifically, recorded data in a bar-code manner is formed by forming recording marks aligned in the form of concentric circles.

Furthermore, in the inner zone, a predetermined area format having a temporary defect management area (TDMA), an optimum power control area (OPC: test write area), an information area (INFO: management information area), a reserve area, a buffer area, and so forth is set.

The OPC is used for e.g. trial writing in setting the data recording/reproduction condition such as the laser power at the time of recording/reproduction. That is, it is the area for adjustment of the recording/reproduction condition.

The INFO includes a defect management area (DMA) and a control data area.

The DMA is provided in the INFO. In general, in the field of the optical disk, alternation management information for defect management is recorded in the DMA. However, in the disk of the present example, management/control information for realizing not only alternation management for a defect place but also data rewriting in this write-once disk is recorded in the DMA. In this case in particular, management information of ISA and OSA to be described later is recorded in the DMA.

To allow data rewriting by utilizing alternation processing, the contents of the DMA also need to be updated responding to the data rewriting. The TDMA is provided for this updating.

The alternation management information is additionally recorded to the TDMA and updated. In the DMA, the last (latest) alternation management information recorded in the TDMA finally is recorded.

The details of the DMA and the TDMA will be described later.

The INFO including the DMA and so forth is the definitive management information area in which the latest management information is finally stored. The INFO (definitive management information area) is disposed separately from each other by at least the distance equivalent to the allowable defect size in all the recording layers.

On the other hand, the TDMA is the temporary management information area in which management information is additionally stored on an as-needed basis. The TDMA (temporary management information area) is disposed in each recording layer almost evenly for example. In some cases, it is disposed in the plural recording layers except the recording layer closest to the disk substrate almost evenly as described later for an example of the quadruple-layer disk.

The area closer to the outer circumference than the inner zone, specifically e.g. the area corresponding to the radius range of 24.0 to 58.0 mm, is used as the data zone. The data zone is the area where user data are actually recorded and reproduced. The starting address ADdts and ending address ADdte of the data zone are indicated by the data zone position information in the above-described control data area.

In the data zone, an inner spare area (ISA) is provided on the innermost circumference side of the data zone and an outer spare area (OSA) is provided on the outermost circumference side of the data zone. The ISA and OSA are used as an alternation area for a defect and data rewriting (overwriting).

The ISA is formed from the start position of the data zone with a size equivalent to a predetermined number of clusters (one cluster=65536 bytes).

The OSA is formed from the end position of the data zone toward the inner circumference with a size equivalent to a predetermined number of clusters. The sizes of the ISA and OSA are described in the above-described DMA.

The leg sandwiched between the ISA and OSA in the data zone is used as the user data area. This user data area is the normal recording/reproduction area used for recording and reproduction of user data normally.

The position of the user data area, i.e. a starting address ADus and an ending address ADue, are described in the DMA.

This user data area serves as the logical address space. That is, the starting address ADus serves as the first logical address (FirstLSN) and the ending address ADue serves as the last logical address (LastLSN).

The area closer to the outer circumference than the data zone, specifically e.g. the area corresponding to the radius range of 58.0 to 58.5 mm, is used as the outer zone (e.g. lead-out zone). Management/control information is recorded also in the outer zone. Specifically, INFO (control data area, DMA, buffer area) is formed in a predetermined format.

The DMA is prepared as the area in which management information of the ISA and OSA is recorded similarly to the DMA in the inner zone.

[2. DMA]

The structure of the DMA recorded in the inner zone and the outer zone will be described below. FIG. 2 shows the structure of the DMA.

Here, an example in which the size of the DMA is 32 clusters (32×65536 bytes) is shown. The cluster is the minimum unit of data recording.

Of course, the DMA size is not limited to 32 clusters. In FIG. 2, 32 clusters are given cluster numbers 1 to 32 to thereby indicate the data position of each of the contents in the DMA. Furthermore, the size of each of the contents is indicated as the number of clusters.

In the DMA, in the leg of four clusters with cluster numbers 1 to 4, detailed information on the disk is recorded as the disk definition structure (DDS).

The contents of this DDS will be described later with FIG. 3. The DDS has a size of one cluster and is repeatedly recorded four times in this four-cluster leg.

The leg of four clusters with cluster numbers 5 to 8 serves as the first recording area for a defect list DFL (DFL#1). The structure of the defect list DFL will be described later with FIG. 4. The defect list DFL is data having a size of four clusters, and individual pieces of alternation address information are listed therein.

The leg of four clusters with cluster numbers 9 to 12 serves as the second recording area for the defect list DFL (DFL#2). Furthermore, the recording areas for the third and subsequent defect lists DFL#3 to DFL#6 are prepared by each group of four clusters, so that the leg of four clusters with cluster numbers 29 to 32 serves as the seventh recording area for the defect list DFL (DFL#7).

That is, in the DMA composed of 32 clusters, seven recording areas for the defect lists DFL#1 to DFL#7 are prepared.

In the case of a BD-R (write-once optical disk), processing of closing needs to be executed to record the contents of this DMA. In this case, all of seven defect lists DFL#1 to DFL#7 written in the DMA include the same contents. The written contents are equal to the contents of the latest TDMA.

In a BD-RE (rewritable optical disk), the TDMA is not provided. This is because the DMA may be rewritten every time recording is performed.

The contents of the DDS recorded at the beginning of the DMA of FIG. 2 are shown in FIG. 3.

As described above, the DDS has a size of one cluster (=65536 bytes).

In FIG. 3, the "byte position" shows byte 0 as the beginning byte of the DDS composed of 65536 bytes. "The number of bytes" indicates the number of bytes of each of the data contents.

In two bytes at byte positions 0 and 1, a DDS identifier="DS" for recognition that this cluster is a cluster of the DDS is recorded.

In one byte at byte position 2, the DDS format number (version of the format) is indicated.

In four bytes at byte positions 4 to 7, the number of times of updating of the DDS is recorded. In the present example, the DMA itself is not updated, but alternation management information is written thereto at the time of closing. The alternation management information is updated in the TDMA. Therefore, when the closing is finally carried out, the number of times of updating of the DDS (TDDS: temporary DDS) in the TDMA is recorded at these byte positions.

In four bytes at byte positions 16 to 19, the starting physical sector address of the drive area in the DMA (AD DRV) is recorded.

In four bytes at byte positions 24 to 27, the starting physical sector address of the defect list DFL in the DMA (AD DFL) is recorded.

Four bytes at byte positions 32 to 35 indicate the beginning position of the user data area in the data zone, i.e. the position at which the logical sector number (LSN: logical sector address) is "0," by the physical sector number (PSN: physical sector address).

Four bytes at byte positions 36 to 39 indicate the end position of the user data area in the data zone by the LSN (logical sector address).

In four bytes at byte positions 40 to 43, the size of the ISA (inner circumference side spare area) in the data zone is indicated.

In four bytes at byte positions 44 to 47, the size of the OSA (outer circumference side spare area) in the data zone is indicated.

In four bytes at byte positions 48 to 51, the size of the last spare area (LSA) in the data zone is indicated. The last spare area is the spare area disposed after the logical address space, and the ISA or OSA in the last recording layer serves as the last spare area depending on the number of recording layers.

In one byte at byte position 52, an alternation area availability flag indicating whether or not data can be rewritten by using the ISA or OSA is indicated. When the whole of the ISA or the OSA has been used, the alternation area availability flag indicates that.

The byte positions other than the above-described positions are regarded as reserves (undefined), and 00h is set at all of these byte positions.

As just described, the DDS includes the addresses of the user data area, the sizes of the ISA and the OSA, and the alternation area availability flag. That is, the DDS is used as management/control information for area management of the ISA and the OSA in the data zone.

Next, the structure of the defect list DFL is shown in FIG. 4.

As described with FIG. 2, the defect list DFL is recorded in the recording area of four clusters.

In FIG. 4, the data position of each of the data contents in the defect list DFL composed of four clusters is shown as the "byte position." The relationship of one cluster=32 sectors=65536 bytes holds, and one sector=2048 bytes.

"The number of bytes" indicates the number of bytes as the size of each of the data contents.

The beginning 64 bytes in the defect list DFL are used as defect list management information.

In this defect list management information, information for recognition that these clusters are clusters of the defect list, the version, the number of times of updating of the defect list, the number of entries in the defect list, etc. are recorded.

At byte position 64 and the subsequent byte positions, pieces of alternation address information ati each composed of eight bytes are recorded as the contents of the entries in the defect list.

Immediately after the last effective alternation address information ati#N, terminator information that is composed of eight bytes and serves as the alternation address information termination is recorded.

In this DFL, 00h is set in all the bytes from the byte subsequent to the alternation address information termination to the last of the clusters.

The defect list management information composed of 64 bytes is as shown in FIG. 5.

In two bytes from byte position 0, a character string "DL" is recorded as the identifier of the defect list DFL.

One byte at byte position 2 indicates the format number of the defect list DFL.

Four bytes from byte position 4 indicate the number of times of updating of the defect list DFL. This number is the value following the number of times of updating of a temporary defect list TDFL to be described later.

Four bytes from byte position 12 indicate the number of entries in the defect list DFL, i.e. the number of pieces of the alternation address information ati.

Four bytes from byte position 24 indicate the size of the free area in each of alternation areas ISA0, ISA1, OSA0, and OSA1 by the number of clusters.

The byte positions other than the above-described positions are used as reserves, and 00h is set at all of these byte positions.

Figure 6:
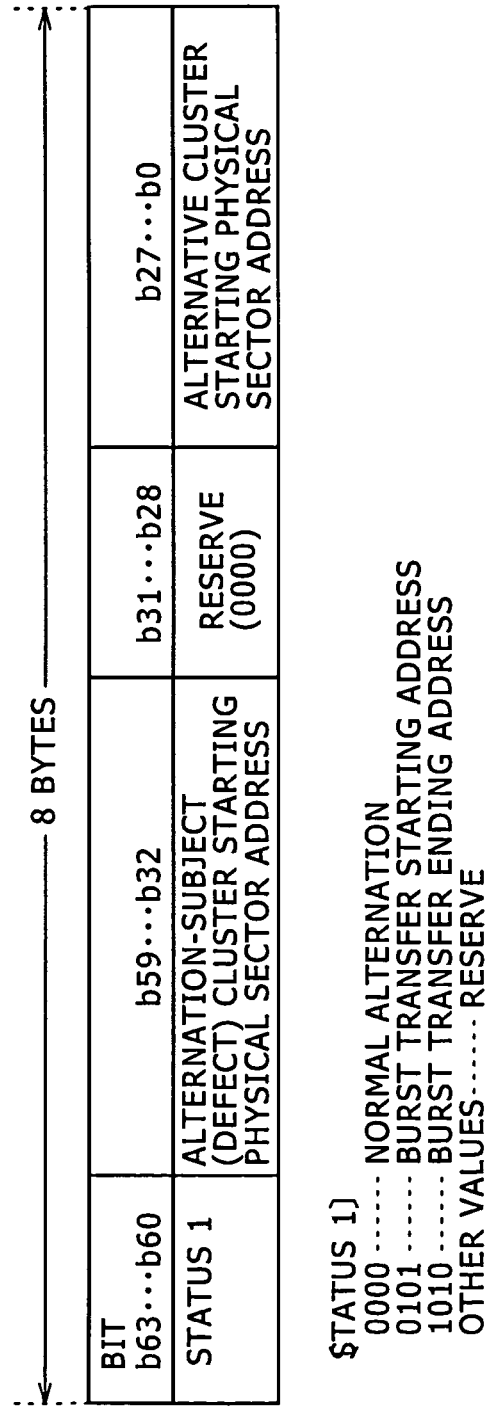
FIG. 6 is an explanatory diagram of alternation address information in the DFL and the TDFL in the disk of the embodiment.

FIG. 6 shows the structure of the alternation address information ati. Specifically, the alternation address information ati indicates the contents of the entry resulting from alternation processing.

The maximum total number of pieces of the alternation address information ati is 32759 in the case of a single-layer disk.

One piece of the alternation address information ati is composed of eight bytes (64 bits). The respective bits are represented as bits b63 to b0.

In bits b63 to b60, status information (status 1) of the entry is recorded.

In the DFL, the status information is set to "0000," which indicates a normal alternation processing entry.

The other status information values will be described later in description of the alternation address information ati in the TDFL in the TDMA.

In bits b59 to b32, the starting physical sector address PSN of the alternation-subject cluster is indicated. Specifically, the cluster replaced due to a defect or rewriting is indicated by the physical sector address PSN of the beginning sector of the cluster.

Bits b31 to b28 are used as a reserve. Alternatively, another piece of status information (status 2) of the entry may be recorded therein.

In bits b27 to b0, the starting physical sector address PSN of the alternative cluster is indicated.

Specifically, if a cluster is replaced due to a defect or rewriting, the cluster as the alternative thereto is indicated by the physical sector address PSN of the beginning sector of the cluster.

The above-described alternation address information ati is regarded as one entry, and the alternation-subject cluster and the alternative cluster relating to one round of alternation processing are indicated.

Such entries are registered in the defect list DFL having the structure of FIG. 4.

In the DMA, alternation management information is recorded with the above-described data structure. However, as described above, the time to record these pieces of information in the DMA is when closing of the disk is carried out. At this time, the latest alternation management information in the TDMA is reflected.

Alternation processing for defect management and data rewriting and updating of the alternation management information in response to the alternation processing are carried out in the TDMA to be described next.

[3. TDMA]

The TDMA provided in the inner zone will be described below. The TDMA (temporary DMA) is used as the area in which alternation management information is recorded as with the DMA. However, the TDMA is updated through additional recording of the alternation management information therein in response to the occurrence of alternation processing for data rewriting or detection of a defect.

In the BD-R, two recording modes are used. One is a random recording mode by use of a space bit map, and the other is a sequential recording mode by use of sequential recording range information (SRRI).

First, a description will be made below by an example in which the space bit map is used in the random recording mode.

FIG. 7 shows the structure of the TDMA.

The size of the TDMA is e.g. 2048 clusters.

As shown in the diagram, in the first cluster given cluster number 1, a space bitmap for layer L0 is recorded.

The space bitmap is made by allocating one bit to each of the clusters of the data zone serving as the main data area and the inner zone and the outer zone, which are the areas in which management/control information is recorded. The space bitmap is used as writing-presence/absence presenting information that is so configured as to indicate whether or not writing has been completed in the respective clusters by the one-bit values.

Although one bit is allocated to each of all the clusters from the inner zone to the outer zone in the space bitmap, this space bitmap can be configured with a size of one cluster.

The cluster of cluster number 1 is used as the space bitmap for layer L0 (first layer). The cluster of cluster number 2 is used as the space bitmap for layer L1 (second layer). Although not shown in the diagram, in the case of a triple-layer disk and a quadruple-layer disk, the space bitmaps for layer L2 (third layer) and layer L3 (fourth layer) are prepared in clusters of predetermined cluster numbers. For example, cluster numbers 3 and 4 are allocated to these space bitmaps.

In the TDMA, a temporary defect list (TDFL) is additionally recorded in the beginning cluster of the unrecorded area in the TDMA if alternation processing is executed because of change of data content or the like. Therefore, in the case of a double-layer disk, the first TDFL is recorded at the position of cluster number 3 as shown in the diagram. In the case of a single-layer disk, the first TDFL is recorded at the position of cluster number 2 because the space bitmap for layer L1 is unnecessary. From then on, in response to the occurrence of alternation processing, the TDFL is additionally recorded at the cluster positions with the intermediary of no unrecorded area between the recorded clusters.

The size of the TDFL is in the range of one cluster to four clusters.

Because the space bitmap is information indicating the writing status of each cluster, it is updated responding to the occurrence of data writing. In this case, the new space bitmap is recorded from the beginning of the free area in the TDMA similarly to the TDFL.

That is, in the TDMA, the space bitmap or the TDFL is additionally recorded on an as-needed basis.

As described next about the configurations of the space bitmap and the TDFL, a temporary disk definition structure (TDDS (temporary DDS)) as detailed information of the optical disk is recorded in the rearmost sector (2048 bytes) of one cluster used as the space bitmap and the rearmost sector (2048 bytes) of one to four clusters used as the TDFL.

Figure 8:
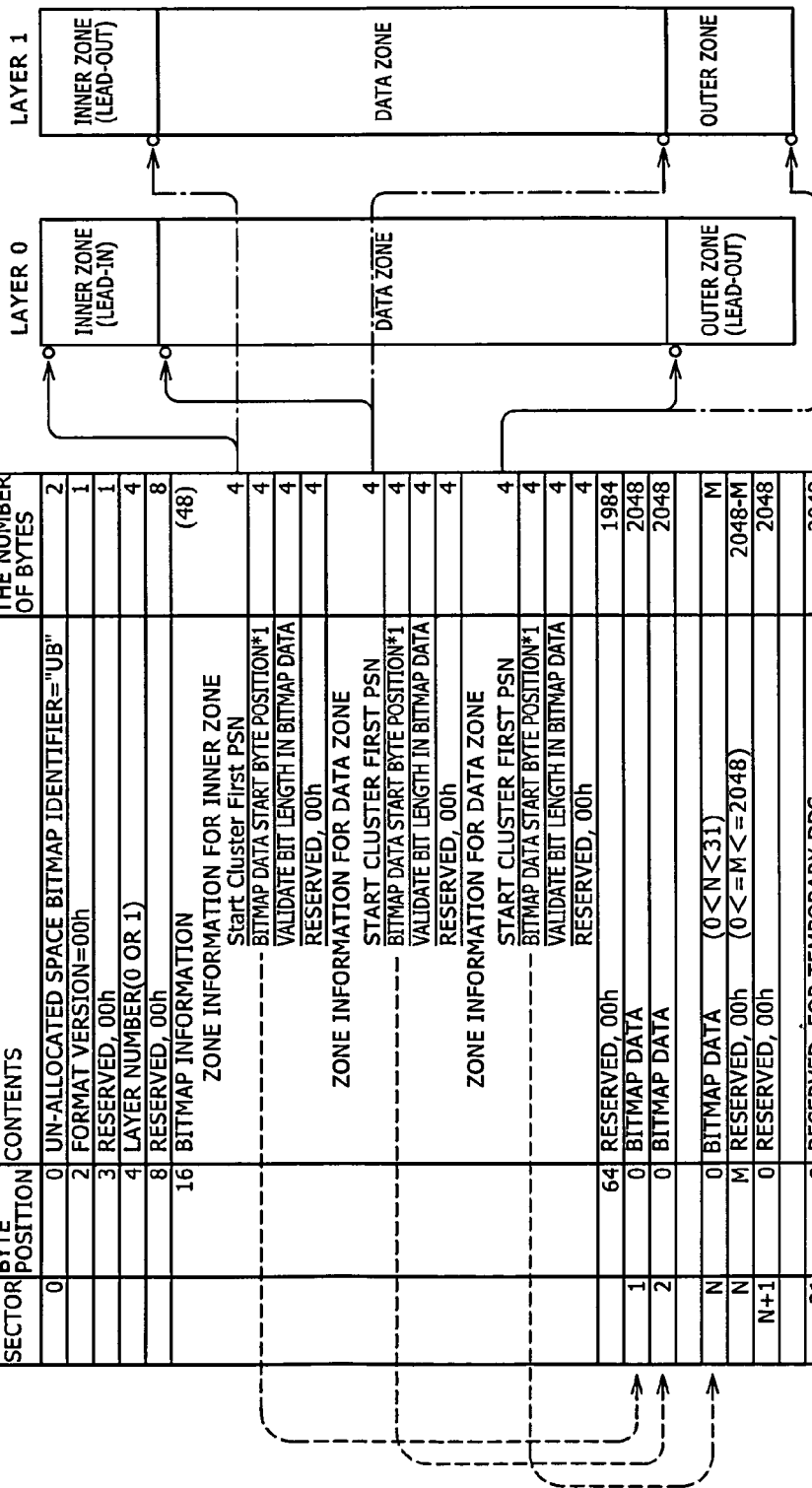
FIG. 8 is an explanatory diagram of a space bitmap in the disk of the embodiment.

FIG. 8 shows the configuration of the space bitmap.

As described above, the space bitmap is a bitmap that represents the recorded/unrecorded state of one cluster on the disk by one bit, and in which e.g. "1" is set to the corresponding bit if the cluster is in the unrecorded state. FIG. 8 shows a space bitmap for the case of a double-layer disk as an example of the bitmap that holds information independent on a layer-by-layer basis. In the case of a triple-layer disk and a quadruple-layer disk, this bitmap is expansively treated.

In FIG. 8, 32 sectors in one cluster are shown as sectors 0 to 31. The "byte position" is shown as the byte position in the sector.

In the beginning sector 0, management information of the space bitmap is recorded.

In two bytes from byte position 0 of sector 0, "UB" is recorded as the space bitmap ID (Un-allocated Space Bitmap Identifier).

In one byte at byte position 2, the format version (format number) is recorded and e.g. "00h" is set therein.

In four bytes from byte position 4, the layer number is recorded. Specifically, whether this space bitmap corresponds to layer L0 or layer L1 is indicated.

In 48 bytes from byte position 16, bitmap information (Bitmap Information) is recorded.

The bitmap information is composed of pieces of zone information corresponding to a respective one of the inner zone, the data zone, and the outer zone (Zone Information for Inner Zone) (Zone Information for Data Zone) (Zone Information for Outer Zone).

Each of the pieces of zone information is composed of 16 bytes. Specifically, in each of the pieces of zone information, four bytes are allocated to each of the start position of the zone (Start Cluster First PSN), the start position of the bitmap data (Start Byte Position of Bitmap data), the size of the bitmap data (Validate Bit Length in Bitmap data), and a reserve.

In the start position of the zone (Start Cluster First PSN), the start position of the zone on the disk, i.e. the start address in turning the zone into the bitmap, is indicated by the PSN (physical sector address).

In the start position of the bitmap data (Start Byte Position of Bitmap data), the start position of the bitmap data relating to the zone is indicated by the number of bytes as the relative position from the Un-allocated Space Bitmap Identifier at the beginning of the space bitmap.

In the size of the bitmap data (Validate Bit Length in Bitmap data), the size of the bitmap data of the zone is indicated by the number of bits.

From byte position 0 of the second sector (=sector 1) of the space bitmap, actual bitmap data (Bitmap data) are recorded. The size of the bitmap data is one sector per 1 GB.

The area from the byte subsequent to the last bitmap data to the byte previous to the final sector (sector 31) is used as reserves and "00h" is set therein.

In the final sector (sector 31) of the space bitmap, the TDDS is recorded.

Management by the above-described bitmap information is as follows.

First, a description will be made about the case of a space bitmap in which layer L0 is indicated as the layer number at byte position 4, i.e. a space bitmap corresponding to layer L0 of a single-layer disk or a multi-layer disk.

In this case, information on the inner zone in layer L0, i.e. the lead-in zone, is indicated by Zone Information for Inner Zone.

By the start position of the zone (Start Cluster First PSN), the PSN of the start position of the inner zone (in this case, the lead-in zone) is indicated as shown by a full-line arrowhead.

By the start position of the bitmap data (Start Byte Position of Bitmap data), the position of the bitmap data corresponding to the inner zone in this space bitmap (information indicating byte position 0 in sector 1) is indicated as shown by a dashed line.

By the size of the bitmap data (Validate Bit Length in Bitmap data), the size of the bitmap data for the inner zone is indicated.

In Zone Information for Data Zone, information on the data zone in layer L0 is indicated.

By the start position of the zone (Start Cluster First PSN), the PSN of the start position of the data zone is indicated as shown by a full-line arrowhead.

By the start position of the bitmap data (Start Byte Position of Bitmap data), the position of the bitmap data corresponding to the data zone in this space bitmap (information indicating byte position 0 in sector 2) is indicated as shown by a dashed line.

By the size of the bitmap data (Validate Bit Length in Bitmap data), the size of the bitmap data for the data zone is indicated.

By Zone Information for Outer Zone, information on the outer zone in layer L0 (e.g. the lead-out zone of a single-layer disk) is indicated.

By the start position of the zone (Start Cluster First PSN), the PSN of the start position of the outer zone is indicated as shown by a full-line arrowhead.

By the start position of the bitmap data (Start Byte Position of Bitmap data), the position of the bitmap data corresponding to the outer zone in this space bitmap (information indicating byte position 0 in sector N) is indicated as shown by a dashed line.

By the size of the bitmap data (Validate Bit Length in Bitmap data), the size of the bitmap data for the outer zone is indicated.

Similar management is carried out also in the space bitmaps about the second and subsequent recording layers such as layer L1. For example, in the space bitmap about layer L1, management of the inner zone, the data zone, and the outer zone about layer L1 is carried out as shown by the one-dot chain lines.

Next, the configuration of the TDFL (temporary DFL) will be described. As described above, the TDFL is recorded in the free area subsequent to the space bitmap in the TDMA, and is additionally recorded at the beginning of the free area in response to every updating.

FIG. 9 shows the configuration of the TDFL.

The TDFL is composed of one to four clusters. As is apparent from comparison with the DFL of FIG. 4, the contents of the TDFL are the same as those of the DFL in that the beginning 64 bytes are used as defect list management information and pieces of alternation address information ati each composed of eight bytes are recorded at byte position 64 and the subsequent byte positions, and in that eight bytes subsequent to the last alternation address information ati#N are used as the alternation address information termination.

However, in the TDFL composed of one to four clusters, a temporary DDS (TDDS) is recorded in 2048 bytes as the last sector thereof, differently from the DFL.

In the case of the TDFL, 00h is set in the area to the byte previous to the final sector of the cluster to which the alternation address information termination belongs. The TDDS is recorded in the final sector. If the alternation address information termination belongs to the final sector of the cluster, 0 is set in the area to the byte previous to the final sector of the next cluster, and the TDDS is recorded in the final sector.

The defect list management information composed of 64 bytes is similar to that in the DFL described with FIG. 5.

However, as the number of times of updating of the defect list by four bytes from byte position 4, the serial number of the defect list is recorded. Due to this feature, the serial number of defect list management information in the latest TDFL indicates the number of times of updating of the defect list.

Furthermore, values at the timing of updating of the TDFL are recorded as the number of entries in the defect list DFL, i.e. the number of pieces of the alternation address information ati, by four bytes from byte position 12 and the size (the number of clusters) of the free area in each of the alternation areas ISA0, ISA1, OSA0, and OSA1 by four bytes from byte position 24.

The structure of the alternation address information ati in the TDFL is also similar to that of the alternation address information ati in the DFL shown in FIG. 6. The alternation address information ati is regarded as one entry and the alternation-subject cluster and the alternative cluster relating to one round of alternation processing are indicated. Such entries are registered in the temporary defect list TDFL having the structure of FIG. 9.

However, as status 1 of the alternation address information ati in the TDFL, "0101" or "1010" is often set besides "0000."

"0101" or "1010" is set as status 1 when physically-consecutive plural clusters are collectively subjected to alternation processing and alternation management (burst transfer management) for these plural clusters is collectively carried out.

Specifically, if status 1 is "0101," the starting physical sector address of the alternation-subject cluster and the starting physical sector address of the alternative cluster in the alternation address information ati indicate the alternation-subject and the alternative about the beginning cluster of physically-consecutive plural clusters.

If status 1 is "1010," the starting physical sector address of the alternation-subject cluster and the starting physical sector address of the alternative cluster in the alternation address information ati indicate the alternation-subject and the alternative about the last cluster of physically-consecutive plural clusters.

Therefore, in the case of carrying out alternation management for physically-consecutive plural clusters collectively, the alternation address information ati does not need to be recorded as an entry for every one of all the plural clusters, but it is enough that two pieces of the alternation address information ati about the beginning cluster and the end cluster are recorded as entries.

As described above, the TDFL basically has the same structure as that of the DFL but has characteristics that the size thereof can be extended to four clusters, the TDDS is recorded in the last sector, burst transfer management is permitted as the alternation address information ati, and so forth.

In the TDMA, the space bitmap and the TDFL are recorded as shown in FIG. 7. As described above, the temporary disk definition structure (TDDS) is recorded in 2048 bytes as the last sector of the space bitmap and the TDFL.

The structure of this TDDS is shown in FIG. 10.

The TDDS is composed of one sector (2048 bytes) and includes the same contents as those of the DDS in the above-described DMA. Although the size of the DDS is one cluster (65536 bytes), the area where substantial contents are defined in the DDS is the area to byte position 52 as described with FIG. 3. That is, the substantial contents are recorded in the beginning sector of one cluster. Therefore, the TDDS can encompass the contents of the DDS although the size thereof is one sector.

As is apparent from comparison between FIG. 10 and FIG. 3, the TDDS has contents similar to those of the DDS at byte positions 0 to 53. However, in the TDDS, the TDDS serial number is recorded from byte position 4. The starting physical address of the drive area in the TDMA is recorded from byte position 16. The starting physical address of the TDFL in the TDMA (AD DFL) is recorded from byte position 24.

At byte position 1024 and the subsequent byte positions in the TDDS, information that is absent in the DDS is recorded.

In four bytes from byte position 1024, the physical sector address PSN of the outermost circumference of the data-recorded area in the user data area is recorded.

In four bytes from byte position 1028, the starting physical sector address of the latest space bitmap for layer L0 in the TDMA (AD BP0) is recorded.

In four bytes from byte position 1032, the starting physical sector address of the latest space bitmap for layer L1 in the TDMA (AD BP1) is recorded.

In one byte at byte position 1036, a flag to control the use of the overwriting function is recorded.

The bytes other than those at these byte positions are used as reserves, and all the contents thereof are 00h.

However, for example in the case of a triple-layer disk, predetermined byte positions in the reserves are decided, and the starting physical sector address of the latest space bitmap for layer L2 in the TDMA (AD BP2) is recorded at these positions.

In the case of a quadruple-layer disk, predetermined byte positions in the reserves are decided, and the starting physical sector address of the latest space bitmap for layer L2 in the TDMA (AD BP2) and the starting physical sector address of the latest space bitmap for layer L3 (AD BP3) are recorded.

Furthermore, at any positions regarded as the reserve in FIG. 10, the next OPC operation executable addresses (Next available Ln OPC Address) about the OPC areas in the respective layers are each recorded by four bytes. That is, the addresses of the parts to be used next for the OPC operation are recorded.

As just described, the TDDS includes the address of the user data area, the sizes of the ISA and the OSA, and the alternation area availability flag. That is, the TDDS is used as management/control information for area management of the ISA and the OSA in the data zone. The TDDS is the same as the DDS in this point.

Moreover, the TDDS has the information indicating the positions of the latest effective space bitmaps (AD BP0, AD BP1 (in addition, AD BP2, AD BP3)), and has the information indicating the position of the latest effective temporary DFL (TDFL) (AD DFL).

In addition, the TDDS has the next OPC operation executable addresses (Next available Ln OPC Address) indicating the unused parts of the OPC areas in the respective layers.

This TDDS is recorded in the final sector of the space bitmap and the TDFL. Therefore, a new TDDS is recorded every time the space bitmap or the TDFL is added. Thus, in the TDMA of FIG. 7, the TDDS in the last added space bitmap or TDFL is the latest TDDS, and the latest space bitmap and the TDFL are indicated therein.

In the TDMA, the contents thereof are updated on an as-needed basis in response to data rewriting and alternation processing. At the time of closing, the contents of the latest TDMA are recorded in the DMA in the INFO, so that the management information is settled.

The updating of the TDMA is carried out in such a manner that a TDMS (Temporary Disk Management Structure) update unit is recorded.

The TDMS is sequentially recorded in consecutive clusters in units of the TDMS update unit responding to that the updating of the management information becomes necessary. In recording of the TDMS update unit, without leaving an unrecorded area after the last recording-completed cluster at this timing, the latest TDMS update unit is recorded.

The above-described TDDS and TDFL and the SRRI to be described later are included in this TDMS update unit. That is, if at least one of the TDDS, the TDFL, and the SRRI is updated, the TDMS update unit is additionally recorded in the TDMA.

In a multi-layer disk such as a triple-layer disk and a quadruple-layer disk, the TDMA is disposed in all or part of the respective recording layers. These TDMAs are used for updating of the TDFL/space bitmap in such a manner as to be exhausted in turn. Due to this feature, the TDMAs in the respective recording layers are collectively used as one large TDMA, and thus the plural TDMAs can be efficiently used.

Furthermore, the effective TDFL/space bitmap can be grasped by merely seeking the last recorded TDDS irrespective of the TDMAs in the respective layers.

Moreover, although not shown in FIG. 7, for determination of the latest TDMA, a first predetermined number of clusters in the TDMA are used as a TDMA access indicator only in the beginning TDMA (e.g. TDMA#1 to be described later).

Supposing that 12 TDMAs, TDMA0 to TDMA11, are provided in the entire disk, the first 12 clusters in the beginning TDMA0 are used as the TDMA access indicator and each represent information of recording of a respective one of TDMAs 1 to 11 and the DMA.

During the use of the beginning TDMA0, no data is recorded in the TDMA access indicator. When the whole of TDMA0 has been used and the use of TDMA1 is started, e.g. "00h" data is recorded in the whole of the first cluster (corresponding to TDMA1) of the TDMA access indicator. When the whole of TDMA1 has been used and the use of TDMA2 is started, e.g. "00h" data is recorded in the whole of the second cluster (corresponding to TDMA2) of the TDMA access indicator. If the TDMA access indicator is used in this manner, the following advantage is achieved. Specifically, e.g. at the time of loading of the disk, the disk drive device can get to know the TDMA in which the TDMA data that is the latest at this timing is recorded by accessing the first TDMA0 and reading the TDMA access indicator. If "00h" has been already recorded in all of 12 clusters of the TDMA access indicator, the disk drive device can get to know that data is recorded in the DMA.

[4. SRR and SRRI]

An example in which SRRI is used in the sequential recording mode will be described below.

The structure of the SRR is shown in FIG. 11. The SRR refers to the writing area (continuous recording range) used for a write-once disk in the sequential recording mode, and has the following characteristics <1> to <5> like the track of the CD.

<1> Inside the SRR, recording is performed in the address increasing direction and only one recordable address (additional recording point) can be possessed. The address as the additional recording point is referred to as NWA (Next Writable Address, PSN).

If the last recorded address inside the SRR is defined as LRA (Last Recorded Address, PSN) as shown in FIG. 11A, the NWA is represented by the following equation.

NWA=(ip(LRA/32)+1)*32 (if LRA≠0)

NWA=Start PSN of the SRR (if LRA=0)

In this equation, ip(N) denotes the maximum integer smaller than N.

That is, if recording has been performed in the SRR, the NWA is the beginning address (PSN) of the cluster subsequent to the cluster including the LRA. If recording has not yet been performed in the SRR, the NWA is the beginning address (PSN) of the SRR.

<2> The SRR takes either one of two statuses, i.e. the open status and the closed status.

The Open SRR of FIG. 11A represents a recordable SRR (i.e. having the NWA), and the Closed SRR of FIG. 11B represents an SRR in which recording is impossible (i.e. having no NWA).

<3> Processing of ensuring the Open SRR on the disk is referred to as the reserve of the SRR, and processing of changing the status of the Open SRR to the Closed status is referred to as the close of the SRR.

<4> Plural (at most 7927) SRRs can exist on the disk. Among them, up to 16 Open SRRs can simultaneously exist.

<5> The SRR as the writing subject can be selected in arbitrary order.

As the actual use method, the reserve of the Open SRR is used in the case of ensuring the management area of the file system in front of file data and recording management information of the file system in the management area after recording the file data in the disk.

FIG. 11C shows the sample layout of a disk when recording is being performed in the sequential recording mode.

Four SRRs (SRR#1 to SRR#4) exist on this disk. SRR#1, SRR#3, and SRR#4 are Open SRRs and SRR#2 is a Closed SRR.

In additional recording to this disk, the recording is possible from any of NWA1, NWA3, and NWA4.

As information for management of the SRR, SRRI is recorded by the above-described TDMS update unit.

FIG. 12 shows the configuration of the SRRI.

The SRRI is configured with the size of data frames 1 to 31.

The relative data frame number (Relative Data Frame) in FIG. 12 indicates the respective data frames in the cluster. The SRRI is disposed immediately before the TDDS recorded in the last data frame 31 of the TDMS update unit. Therefore, when the SRRI has the size of M sectors, the SRRI is disposed in the range from the data frame (31-M) to the data frame 30. The byte position in the data frame (Byte position in Data frame) indicates the byte position inside the respective data frames.

64 bytes from the beginning of the SRRI are used as the SRRI header (SRRI Header) in which the management information of the SRRI is included.

The SRRI header is composed of information for recognition that this cluster is the SRRI cluster, and information on the version, the number of times of SRRI updating (SRRI recording updating), the total number of SRR entries (blocks indicating the information of the SRR), and so forth.

The byte at byte position 64 and the subsequent bytes are used as a list by plural SRR entries (List of SRRI Entries).

The size of each one SRR entry included in the list (List of SRRI Entries) is eight bytes. If N SRR entries exist, the size of the list is N×eight bytes.

SRRI termination (SRRI Terminator) of eight bytes is disposed immediately after the last SRR entry, and the subsequent bytes are filled with zero until the last of the cluster.

FIG. 13A shows the configuration of the SRRI header.

Two bytes at byte positions 0 and 1 are used as the SRRI-ID (SRRI Identifier) in which the management information of the SRRI is included.

One byte at byte position 2 is used as the SRRI format (SRRI Format) indicating the version of the SRRI format.

Four bytes at byte positions 4 to 7 are used as the SRRI update count (SRRI Update Count) indicating the number of times of updating of the SRRI.

Four bytes at byte positions 12 to 15 are used as the number of SRR entries (Number of SRR Entries) indicating the total number of SRR entries.

One byte at byte position 16 is used as the number of open SRRs (Number of Open SRRs) indicating the total number of SRRs whose status is the open status.

From byte position 20, a list of collection of all Open SRR numbers (List of Open SRR Numbers) is recorded.

FIG. 13B shows the structure of this list (List of Open SRR Numbers). Each Open SRR number has the size of two bytes, and the list has a total size for 16 numbers, i.e. 32 bytes. If the total number of Open SRRs is smaller than 16, the remaining part of the list (List of Open SRR Numbers) is filled with zero. Every time the total number of Open SRRs increases or decreases, correction of the contents of the list (List of Open SRR Numbers) and sorting in the descending order need to be carried out.

Figure 14:
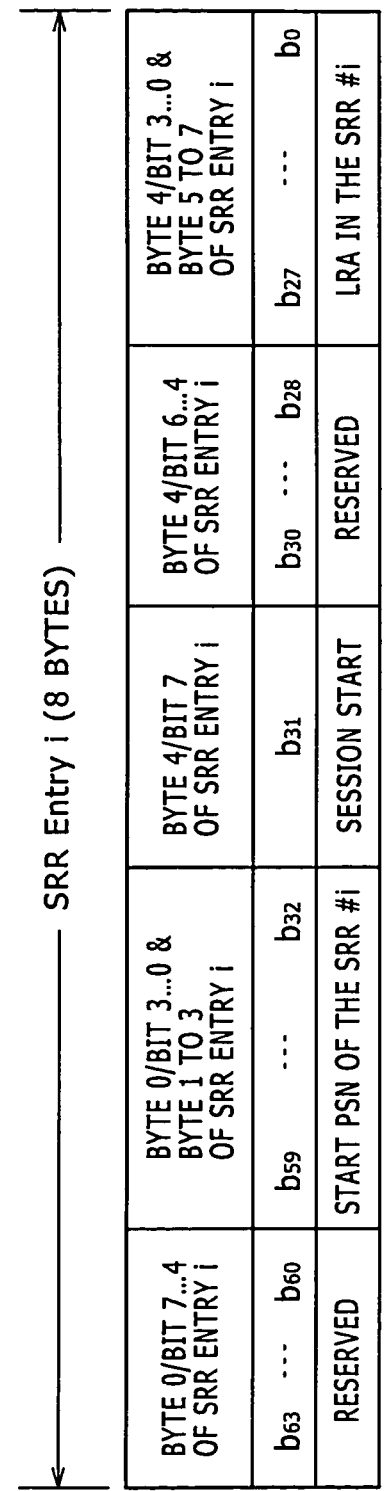
FIG. 14 is an explanatory diagram of an SRR entry in the disk of the embodiment.

FIG. 14 shows the configuration of the SRR entry registered in the entry list (List of SRRI Entries) in FIG. 12 subsequent to this SRRI header. The entry number thereof is defined as i.

The individual SRR entries each indicating a certain SRR are composed of eight bytes (64 bits).

Four bits of bits b63 to b60 are reserves (undefined).

28 bits of bits b59 to b32 are used as the start address of SRR#i existing in the user data area. That is, the PSN of the beginning of the starting cluster of SRR#i is indicated.

Bit b31 is used as the session start and used as the bit indicating whether or not this SRR is the first SRR of the session. When this bit is 1, this indicates that this SRR is the first SRR of the session, i.e. the session starts from this SRR.

Three bits of bits b30 to b28 are reserves (undefined).

In 28 bits of bits b27 to b0, the LRA (Last Recorded Address: see FIGS. 11A to 11C) in SRR#i is indicated by PSN.

By the SRRI including the SRRI header and the SRR entries as described above, the number and addresses of SRRs existing in the user data area and the LRA of each SRR are managed. Furthermore, as described above, the NWA (Next Writable Address) of the Open SRR can be calculated from the value of the LRA (Last Recorded Address) in the SRR entry corresponding to this SRR.

Such an SRRI is updated in such a manner that the SRRI is included in the above-described TDMS update unit when updating of the management state of the SRR is necessary, such as when the SRR is reserved, when additional recording is performed from NWA in the SRR, or when the SRR is closed.

[5. Alternation Processing by Use of Alternation Area]

Alternation processing by use of fixed alternation areas as the ISA and the OSA will be described below.

The ISA (inner spare area: inner circumference side alternation area) and the OSA (outer spare area: outer circumference side alternation area) are ensured on the inner circumference side and the outer circumference side in the data zone as alternation area for alternation processing of a defect cluster.

The sizes of the ISA and the OSA are defined in the above-described DDS and TDDS.

The capacities (sizes) of the ISA and the OSA are decided in physical formatting.

The alternation processing of a defect cluster by use of these ISA and OSA is executed as follows.

For example, if the cluster specified as the writing address is a defect cluster in data writing responding to a request from the host device, proper data recording cannot be carried out. In this case, the data as the recording target is written in a certain cluster in the ISA or OSA. This is the alternation processing.

This alternation processing is managed as the above-described DFL entry. Specifically, one DFL entry is registered in such a manner that the address of the defect cluster in which data recording cannot be performed is treated as the alternation subject and the address of the cluster to which the data is written in the ISA or OSA is treated as the alternative.

[6. Multi-Layer Disk Structure]

The layer structures of multi-layer disks will be described below with FIGS. 15A to 15C.

Figure 15A:
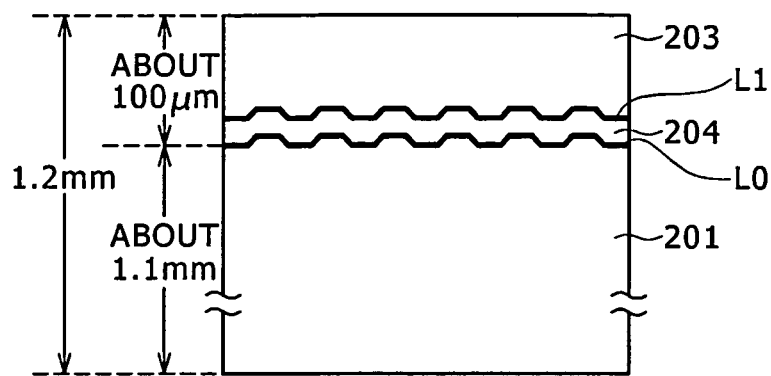
FIGS. 15A to 15C are explanatory diagrams of the layer structure of the disk of the embodiment.
Figure 15B:
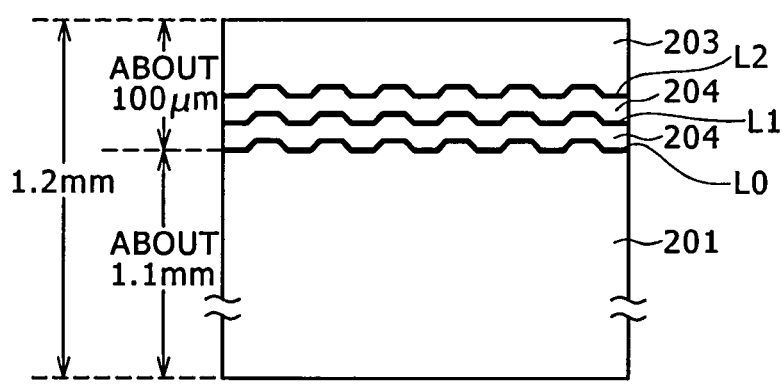
Figure 15C:
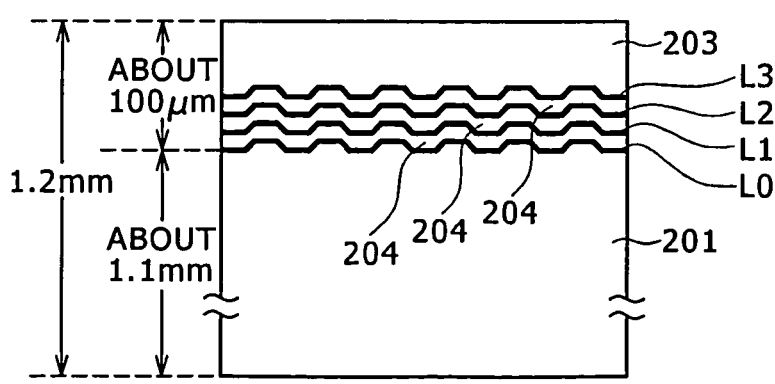

FIG. 15A, FIG. 15B, and FIG. 15C schematically show the layer structure of an existing double-layer disk, a triple-layer disk of the embodiment, and a quadruple-layer disk of the embodiment, respectively.

Each of the disks of FIGS. 15A, 15B, and 15C has a disk substrate 201 having a thickness of about 1.1 mm. The disk substrate 201 is shaped by e.g. injection molding of a polycarbonate resin. A stamper is set in a mold for the injection molding, and thereby the disk substrate 201 to which a groove shape is transferred is formed.

In the case of the double-layer disk, as shown in FIG. 15A, the first layer (layer L0) is formed on the substrate 201, and the second layer (layer L1) is formed with the intermediary of an intermediate layer 204. Furthermore, an optically-transparent layer 203 is formed on the second layer (layer L1).

The surface of the optically-transparent layer 203 serves as the laser-incident surface.

The optically-transparent layer 203 is formed for the purpose of protecting the optical disk. Recording and reproduction of an information signal are performed by e.g. focusing of laser light on layer L0 or L1 through the optically-transparent layer 203.

The optically-transparent layer 203 is formed by e.g. spin-coating of a UV-curable resin and curing thereof by UV irradiation. Alternatively, it is also possible to form the optically-transparent layer 203 by using a UV-curable resin and a polycarbonate sheet or an adhesive layer and a polycarbonate sheet.

The optically-transparent layer 203 has a thickness of about 100 μm. When it is combined with the substrate 201 having a thickness of about 1.1 mm, the thickness of the entire optical disk is about 1.2 mm.

The triple-layer disk of FIG. 15B includes three recording layers, i.e. layers L0, L1, and L2.

Also in this disk, layers L0, L1, and L2 are formed over the substrate 201 with the intermediary of the intermediate layers 204.

The quadruple-layer disk of FIG. 15C includes four recording layers, i.e. layers L0, L1, L2, and L3. Also in this disk, layers L0, L1, L2, and L3 are formed over the substrate 201 with the intermediary of the intermediate layers 204.

Each of the intermediate layers 204 in FIGS. 15A, 15B, and 15C is formed by e.g. rotational coating of an optically-transparent material having UV-photosensitivity by a spin-coating method and curing thereof by UV irradiation.

In the case of performing recording/reproduction of an information signal to/from a multi-layer optical disk recording medium, the arrangement and film thickness of this intermediate layer 204 are designed for the purpose of suppressing inter-layer crosstalk.

In the triple-layer disk, layer L2 is provided at a position distant from the laser-incident surface by about 50 μm. In the quadruple-layer disk, the thickness of the intermediate layers 204 is adjusted and layer L3 is provided at a position distant from the laser-incident surface by about 50 μm.

The triple-layer disk of FIG. 15B is manufactured through the following procedure (ST1 to ST7) for example.

(ST1) The disk substrate 201 to which the groove pattern of layer L0 is transferred is fabricated by injection molding with use of a stamper for layer L0.

(ST2) A recording film is deposited on the groove pattern for L0 by sputtering or the like to form layer L0.

(ST3) A resin is extended on layer L0 by spin-coating and the resin is cured while a stamper for layer L1 is pressed against the resin. Thereby, the intermediate layer 204 to which the groove pattern of layer L1 is transferred is formed.

(ST4) A recording film is deposited on the groove pattern for L1 by sputtering or the like to form layer L1.

(ST5) A resin is extended on layer L1 by spin-coating and the resin is cured while a stamper for layer L2 is pressed against the resin. Thereby, the intermediate layer 204 to which the groove pattern of layer L2 is transferred is formed.

(ST6) A recording film is deposited on the groove pattern for L2 by sputtering or the like to form layer L2.

(ST7) The optically-transparent layer 203 is formed by a technique such as spin-coating and curing, or sheet bonding.

Through the above-described steps, the triple-layer disk is manufactured.

In the case of the quadruple-layer disk, the steps for layer L3 are added, so that it is manufactured through the following procedure (ST11 to ST19) for example.

(ST11) The disk substrate 201 to which the groove pattern of layer L0 is transferred is fabricated by injection molding with use of a stamper for layer L0.

(ST12) A recording film is deposited on the groove pattern for L0 by sputtering or the like to form layer L0.

(ST13) A resin is extended on layer L0 by spin-coating and the resin is cured while a stamper for layer L1 is pressed against the resin. Thereby, the intermediate layer 204 to which the groove pattern of layer L1 is transferred is formed.

(ST14) A recording film is deposited on the groove pattern for L1 by sputtering or the like to form layer L1.

(ST15) A resin is extended on layer L1 by spin-coating and the resin is cured while a stamper for layer L2 is pressed against the resin. Thereby, the intermediate layer 204 to which the groove pattern of layer L2 is transferred is formed.

(ST16) A recording film is deposited on the groove pattern for L2 by sputtering or the like to form layer L2.

(ST17) A resin is extended on layer L2 by spin-coating and the resin is cured while a stamper for layer L3 is pressed against the resin. Thereby, the intermediate layer 204 to which the groove pattern of layer L3 is transferred is formed.

(ST18) A recording film is deposited on the groove pattern for L3 by sputtering or the like to form layer L3.

(ST19) The optically-transparent layer 203 is formed by a technique such as spin-coating and curing, or sheet bonding.

Through the above-described steps, the quadruple-layer disk is manufactured.

[7. Disk Drive Device]

Next, a description will be made below about a disk drive device (recording/reproduction device) capable of dealing with the triple-layer disk, the quadruple-layer disk, and a multi-layer disk having more layers of the present example as the BD-R and the BD-RE.

The disk drive device of the present example can execute physical formatting for a disk in which e.g. only the above-described BCA and PIC are formed but no data is recorded in the recordable area and further execute file system initialization thereafter. Thereby, the disk layout in the state to be described later with FIGS. 17A and 17B can be formed. Furthermore, for such a formatted disk, the disk drive device performs recording/reproduction of data to/from the user data area. The disk drive device also performs recording/updating of the TDMA, the ISA, and the OSA on an as-needed basis.

The disk is often shipped after physical formatting thereof has been completed on the manufacturer side. Furthermore, in some cases, the disk is shipped after file system initialization has been completed. In such a case, physical formatting and file system initialization do not need to be carried out by a disk drive device on the user side.

Figure 16:
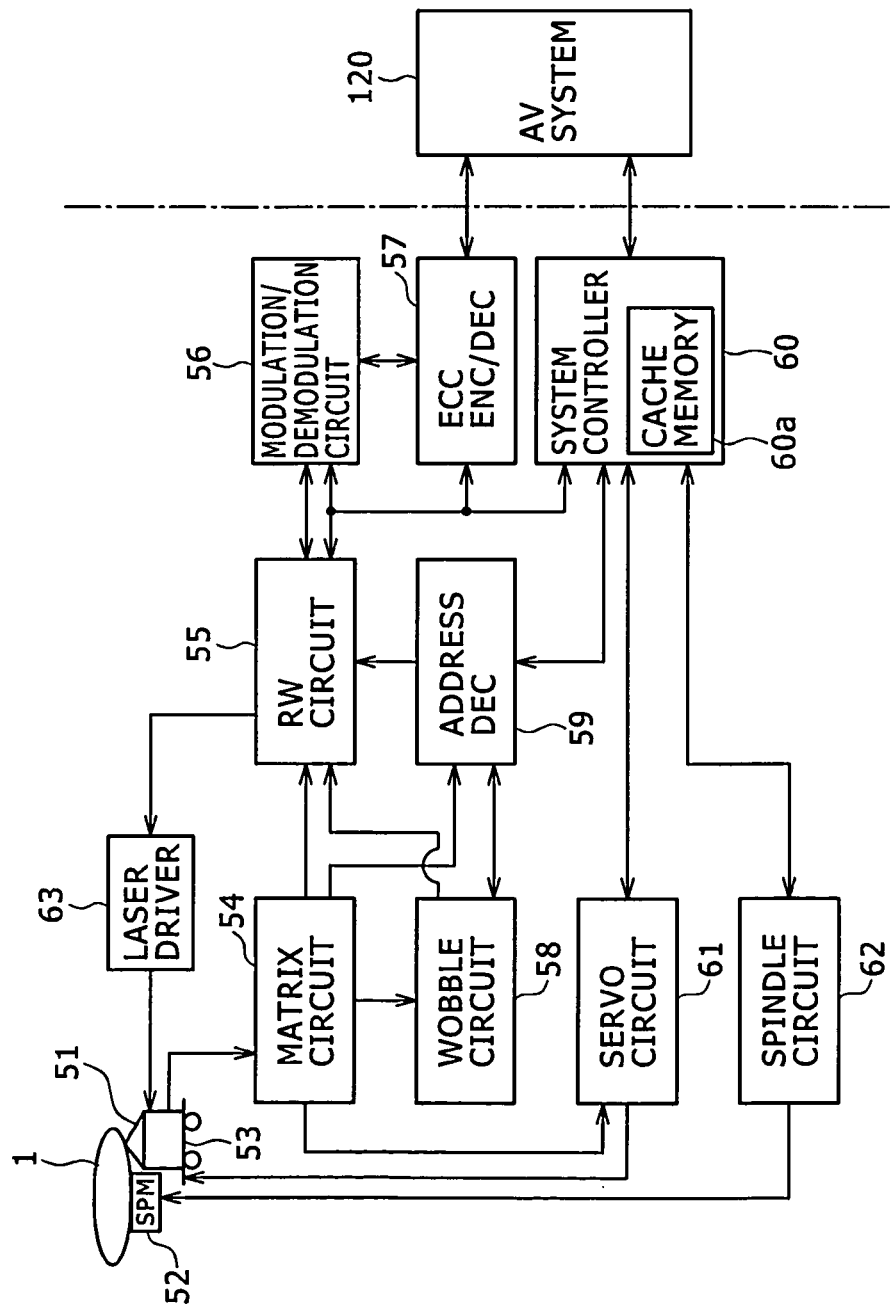
FIG. 16 is a block diagram of a disk drive device of the embodiment.

FIG. 16 shows the configuration of the disk drive device.

A disk 1 is the triple-layer disk or the quadruple-layer disk of the above-described embodiment. The disk 1 is placed on a turntable (not shown) and is rotationally driven by a spindle motor 52 at a constant linear velocity (CLV) at the time of recording/reproduction.

An optical pick-up (optical head) 51 reads out management/control information as the ADIP address and pre-recorded information embedded as the wobbling of the groove track on the disk 1.

At the time of physical formatting, file system initialization and at the time of user data recording, management/control information and user data are recorded in the track in the recordable area by the optical pick-up 51. At the time of reproduction, the recorded data is read out by the optical pick-up 51.

In the optical pick-up 51, the following components (not shown) are formed: a laser diode serving as the laser light source; a photodetector for detecting reflected light; an objective lens serving as the output terminal of laser light; and an optical system that emits the laser light to the disk recording surface via the objective lens and guides reflected light of the laser light to the photodetector.

In the optical pick-up 51, the objective lens is held movably in the tracking direction and the focus direction by a biaxial mechanism.

The whole of the optical pick-up 51 is permitted to move in the disk radial direction by a sled mechanism 53.

The laser diode in the optical pick-up 51 is driven for laser light emission by a drive signal (drive current) from a laser driver 63.

Reflected-light information from the disk 1 is detected by the photodetector in the optical pick-up 51, and is converted to an electrical signal dependent on the amount of received light to be supplied to a matrix circuit 54.

The matrix circuit 54 includes a current-voltage conversion circuit, a matrix calculation/amplification circuit, and so forth for the output current from plural light-receiving elements as the photodetector, and generates the necessary signal by matrix calculation processing.

For example, the matrix circuit 54 generates a high-frequency signal equivalent to reproduction data (reproduction data signal), a focus error signal and a tracking error signal for servo control, and so forth.

Furthermore, the matrix circuit 54 generates a push-pull signal as a signal relating to the wobbling of the groove, i.e. a signal to detect the wobbling.

The matrix circuit 54 is integrally formed in the optical pick-up 51 in some cases.

The reproduction data signal output from the matrix circuit 54 is supplied to a reader/writer circuit 55. The focus error signal and the tracking error signal are supplied to a servo circuit 61. The push-pull signal is supplied to a wobble circuit 58.

The reader/writer circuit 55 executes binarization processing, reproduction clock generation processing by a PLL, and so forth for the reproduction data signal to reproduce the data read out by the optical pick-up 51 and supply the data to a modulation/demodulation circuit 56.

The modulation/demodulation circuit 56 includes a functional part serving as a decoder at the time of reproduction and a functional part serving as an encoder at the time of recording.

At the time of reproduction, the modulation/demodulation circuit 56 executes demodulation processing of the run-length limited code based on the reproduction clock, as decode processing.

An ECC encoder/decoder 57 executes ECC encode processing of adding the error correction code at the time of recording, and executes ECC decode processing of performing error correction at the time of reproduction.

At the time of reproduction, the ECC encoder/decoder captures the data resulting from demodulation by the modulation/demodulation circuit 56 into the internal memory and executes error detection/correction processing, deinterleaving processing, and so forth to obtain reproduction data.

The data obtained by the decoding to the reproduction data by the ECC encoder/decoder 57 is read out and transferred to connected apparatus such as an audio-visual (AV) system 120 based on a command by a system controller 60.

The push-pull signal output from the matrix circuit as the signal relating to the wobbling of the groove is processed in the wobble circuit 58. The push-pull signal as ADIP information is demodulated into a data stream forming the ADIP address in the wobble circuit 58 and is supplied to an address decoder 59.

The address decoder 59 decodes the supplied data to obtain an address value and supply it to the system controller 60.

Furthermore, the address decoder 59 generates a clock by PLL processing by use of the wobble signal supplied from the wobble circuit 58, and supplies the clock to the respective units as e.g. an encode clock at the time of recording.

Furthermore, as the push-pull signal output from the matrix circuit 54 as the signal relating to the wobbling of the groove, the push-pull signal as pre-recorded information (PIC) is subjected to bandpass filter processing in the wobble circuit 58 and then supplied to the reader/writer circuit 55. Subsequently, the signal is binarized to be turned to a data bit stream and thereafter subjected to ECC decode and deinterleaving in the ECC encoder/decoder 57, so that data as the pre-recorded information is extracted. The extracted pre-recorded information is supplied to the system controller 60.

The system controller 60 can execute various kinds of operation setting processing, copy protect processing, and so forth based on the read pre-recorded information.

At the time of recording, recording data is transferred from the AV system 120. This recording data is sent to a memory in the ECC encoder/decoder 57 and buffered therein.

In this case, the ECC encoder/decoder 57 executes error correction code addition, interleaving, and addition of a subcode and so forth as encode processing for the buffered recording data.

The data resulting from the ECC encode is subjected to modulation of e.g. the RLL (1-7) PP system in the modulation/demodulation circuit 56, and then supplied to the reader/writer circuit 55.

As the encode clock serving as the reference clock for the encode processing at the time of recording, the clock generated from the wobble signal as described above is used.

The recording data generated by the encode processing is subjected to recording compensation processing by the reader/writer circuit 55. As the recording compensation processing, the reader/writer circuit 55 carries out e.g. fine adjustment of the optimum recording power dependent on the characteristics of the recording layer, the spot shape of the laser light, the recording linear velocity, and so forth and adjustment of the waveform of the laser drive pulse. Thereafter, the recording data is sent to the laser driver 63 as the laser drive pulse.

The laser driver 63 gives the supplied laser drive pulse to the laser diode in the optical pick-up 51 to carry out laser light emission driving. Thereby, the pits corresponding to the recording data are formed on the disk 1.

The laser driver 63 includes a so-called auto power control (APC) circuit and controls the laser output so that the laser output may be kept constant irrespective of the temperature and so forth while monitoring the laser output power based on the output of a detector for laser power monitoring provided in the optical pick-up 51. The target values of the laser output in recording and reproduction are given from the system controller 60, and the laser output level is so controlled as to be at the target value in each of recording and reproduction.

The servo circuit 61 generates various kinds of servo drive signals for focus, tracking, and sled from the focus error signal and the tracking error signal from the matrix circuit 54 to make the related components carry out servo operation.

Specifically, the servo circuit 61 generates a focus drive signal and a tracking drive signal depending on the focus error signal and the tracking error signal to drive a focus coil and a tracking coil of the biaxial mechanism in the optical pick-up 51. Thereby, a tracking servo loop and a focus servo loop by the optical pick-up 51, the matrix circuit 54, the servo circuit 61, and the biaxial mechanism are formed.

Furthermore, in response to a track jump command from the system controller 60, the servo circuit 61 turns off the tracking servo loop and outputs a jump drive signal to thereby make the related components carry out track jump operation.

In addition, the servo circuit 61 generates a sled drive signal based on a sled error signal obtained as the low-frequency component of the tracking error signal, access execution control from the system controller 60, and so forth, to drive the sled mechanism 53. The sled mechanism 53 has a mechanism formed of a main shaft for holding the optical pick-up 51, a sled motor, a transmission gear, and so forth, although not shown in the diagram. The sled mechanism 53 drives the sled motor in accordance with the sled drive signal, and thereby the requisite slide movement of the optical pick-up 51 is performed.

A spindle servo circuit 62 carries out control to cause the CLV rotation of the spindle motor 52.

The spindle servo circuit 62 obtains the clock generated by the PLL processing for the wobble signal as information on the present rotational velocity of the spindle motor 52, and compares the information with predetermined CLV reference velocity information to thereby generate a spindle error signal.

At the time of data reproduction, the reproduction clock (clock serving as the basis of decode processing) generated by the PLL in the reader/writer circuit 55 serves as the information on the present rotational velocity of the spindle motor 52. Thus, it is also possible for the spindle servo circuit 62 to generate the spindle error signal by comparing this information with the predetermined CLV reference velocity information.

The spindle servo circuit 62 outputs a spindle drive signal generated depending on the spindle error signal to cause the CLV rotation of the spindle motor 52.

In addition, the spindle servo circuit 62 generates the spindle drive signal in response to a spindle kick/brake control signal from the system controller 60 to thereby make the spindle motor 52 carry out also operation of activation, stop, acceleration, deceleration, etc.

Various kinds of operation of the above-described servo system and recording/reproduction system are controlled by the system controller 60 formed of a microcomputer.

The system controller 60 executes various kinds of processing in response to a command from the AV system 120.

For example, when a writing order (write command) of stream data is issued from the AV system 120, first the system controller 60 makes the optical pick-up 51 move to the address to which data should be written in the user data area. Subsequently, the system controller 60 makes the ECC encoder/decoder 57 and the modulation/demodulation circuit 56 execute the encode processing for stream data (e.g. video data of any of various systems and audio data) transferred from the AV system 120 in the above-described manner. Subsequently, the laser drive pulse from the reader/writer circuit 55 is supplied to the laser driver 63, and thereby recording is performed.

To record stream data to the disk 1, it is necessary that physical formatting and file system initialization have been completed as a premise.

In the case of carrying out the physical formatting, the system controller 60 controls the respective units so that information as the TDMA and the INFO may be written at predetermined positions in the inner zone and the outer zone. As described later, the size setting of the ISA, the OSA, and the LSA is carried out at this time based on a predetermined condition.

In the case of carrying out also the file system initialization for the disk 1 for which the physical formatting has been carried out, the system controller 60 refers to the information of the TDMA and the INFO and controls the respective units so that the file system may be recorded in the area from the first logical address and the area near the last logical address.

For example when a read command for requiring transfer of certain data (e.g. MPEG2 video data) recorded in the disk 1 is supplied from the AV system 120, first the system controller 60 carries out seek operation control with the aim of the indicated address. Specifically, the system controller 60 issues a command to the servo circuit 61 to make the optical pick-up 51 carry out access operation with targeting on the address specified by the seek command.

Thereafter, the system controller 60 carries out operation control necessary to transfer data of the indicated data leg to the AV system 120. That is, the system controller performs data readout from the disk 1, and makes the reader/writer circuit 55, the modulation/demodulation circuit 56, and the ECC encoder/decoder 57 execute decode/buffering and so forth to transfer the requested data.

At the time of recording/reproducing of these data, the system controller 60 can control access and recording/reproduction operation by using the ADIP address detected by the wobble circuit 58 and the address decoder 59.

Furthermore, at a predetermined timing such as the timing of loading of the disk 1, the system controller 60 makes the related units perform readout of the unique ID recorded in the BCA of the disk 1 and the pre-recorded information (PIC) recorded in the reproduction-only area as the wobbling groove.

In this case, first the system controller 60 carries out seek operation control with the aim of the BCA and the PIC. Specifically, the system controller 60 issues a command to the servo circuit 61 to make the optical pick-up 51 carry out access operation to the disk innermost circumference side.

Thereafter, the system controller 60 makes the optical pick-up 51 perform reproduction tracing to obtain the push-pull signal as reflected-light information, and makes the wobble circuit 58, the reader/writer circuit 55, and the ECC encoder/decoder 57 execute decode processing. Thereby, the system controller 60 obtains reproduction data as the BCA information and the pre-recorded information.

The system controller 60 carries out laser power setting, copy protect processing, and so forth based on the BCA information and the pre-recorded information read out in this manner.

In FIG. 16, a cache memory 60a is shown in the system controller 60. This cache memory 60a is utilized for e.g. holding and updating of the TDFL/space bitmap read out from the TDMA in the disk 1.

When the disk 1 is loaded for example, the system controller 60 controls the respective units to make them perform readout of the TDFL/space bitmap recorded in the TDMA, and holds the read information in the cache memory 60a.

Thereafter, when alternation processing due to data rewriting or a defect is executed, the TDFL/space bitmap in the cache memory 60a is updated.

For example, the TDFL or the space bitmap may be additionally recorded in the TDMA in the disk 1 every time alternation processing is executed due to data writing, data rewriting, or the like and the space bitmap or the TDFL is updated. However, this scheme consumes the TDMA in the disk 1 fast.

To avoid this disadvantage, the TDFL/space bitmap is updated in the cache memory 60a during the period until the disk 1 is ejected from the disk drive device for example. At the time of the ejection or the like, the final (latest) TDFL/space bitmap in the cache memory 60a is written to the TDMA in the disk 1. Thus, updating on the disk 1 is so performed that a large number of times of updating of the TDFL/space bitmap are put together. This can reduce the consumption of the TDMA in the disk 1.

In the configuration example of the disk drive device of FIG. 16, the disk drive device is connected to the AV system 120. However, the disk drive device according to the embodiment of the present invention may be connected to e.g. a personal computer.

Alternatively, it is also possible to employ a form in which the disk drive device is not connected to another device. In this case, the disk drive device is provided with an operating unit and a display unit, and the configuration of the interface part for data input/output is different from that in FIG. 16. That is, recording and reproduction are performed in accordance with the operation by the user, and a terminal part for input/output of various kinds of data is formed.

Of course, a wide verity of other configuration examples will also be possible. For example, an example as a recording-only device for physical formatting will also be available.

[8. Recording Layer Structure of Embodiment]

Figure 17A:
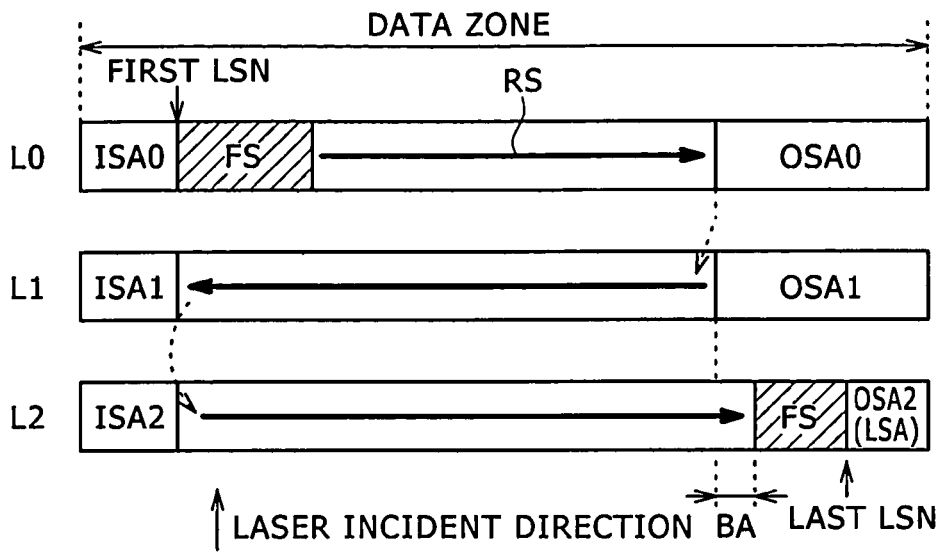
FIGS. 17A and 17B show structure examples of each of recording layers in the disk of the embodiment.
Figure 17B:
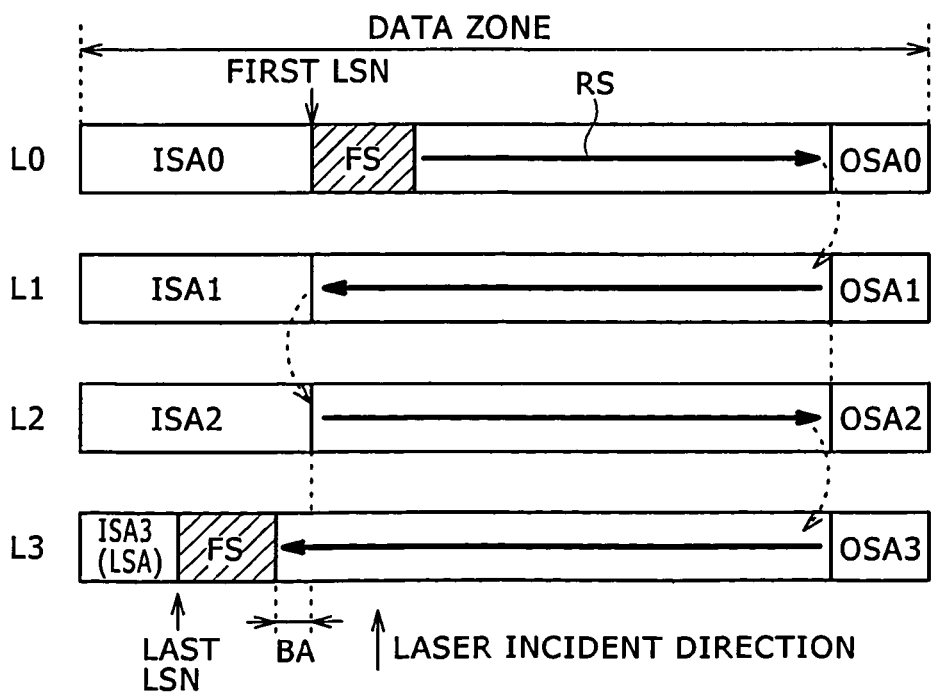

FIGS. 17A and 17B show structure examples of the recording layers (layers) of a triple-layer disk and a quadruple-layer disk of the embodiment of the present invention as the BD-R and the BD-RE.

FIGS. 17A and 17B show the state after physical formatting and file system initialization about only the data zone in the area structure along the radial direction in FIG. 1.

FIG. 17A shows an example of a triple-layer disk in which layers L0, L1, and L2 are formed.

As shown also in FIG. 15B, from the viewpoint of the laser incidence side, layer L0 is formed at the remotest position, and layers L1 and L2 are disposed in that order toward the closest side.

In layers L0, L1, and L2, the area on the inner circumference side in the data zone is used as ISA0, ISA1, and ISA2, respectively. The areas on the outer circumference side of layers L0, L1, and L2 are used as OSA0, OSA1, and OSA2. In the case of this triple-layer disk, the OSA2 serves as the LSA (last spare area).

In each of layers L0, L1, and L2, the area between the ISA and the OSA is used as the logical address space, and user data are recorded therein. The logical address space is the area to which the logical address (logical sector number LSN) is allocated.

The position of the first logical address (FirstLSN) forming the logical address space is immediately after the ISA0 in layer L0. The position of the last logical address (LastLSN) is immediately before the OSA2 (LSA) in layer L2.

A predetermined leg from the first logical address is the area in which a file system FS is recorded.

A predetermined leg to the last logical address is also the area in which the file system FS is recorded. For example 100 clusters are enough as the size of the file system area near the last logical address.

In the data zone, stream data such as video stream data are recorded as user data. As shown by an arrowhead RS, in layer L0, the recording of stream data is performed along the direction from the position immediately after the file system FS toward the outer circumference side. Next, in layer L1, the recording is performed along the direction from the part immediately before the OSA1 toward the inner circumference side. Furthermore, in layer L2, the recording is performed along the direction from the position immediately after the ISA2 toward the outer circumference side.

Here, attention should be paid to the area of the file system FS in layer L2, which is on the closest side from the viewpoint of the laser incidence side (file system area near the last logical address).

In layers L1 and L0 different from layer L2, in which the area of the file system FS near the last logical address is disposed, the logical address space is not allocated to the areas overlapping with the area of this file system FS in the layer stacking direction.

Specifically, in this case, in layers L0 and L1, the OSA0 and the OSA1 are disposed as the areas overlapping with the area of this file system FS in the layer stacking direction.

This is realized by setting the size of the alternation areas (OSA1 and OSA0) of layers L1 and L0 larger than the total of the size of the OSA2 as the alternation area adjacent to the last logical address (LastLSN) and the size of the area of the file system FS.

As described above with FIG. 3 and FIG. 10, in the DDS, the respective sizes of the ISA, the OSA, and the LSA are prescribed as the inner circumference side spare area size, the outer circumference side spare area size, and the last spare area size. In other words, the structure shown in FIG. 17A can be realized by setting of the respective sizes of these areas recorded in the TDDS in physical formatting.

The size of the OSA0 and the OSA1 is prescribed by the value of the "outer circumference side spare area size."

Because the OSA2 is the last spare area LSA, its size is prescribed by the value of the "last spare area size."

Therefore, if the outer circumference side spare area size is defined as szOSA, the last spare area size is defined as szLSA, and the file system size is defined as szFS, the outer circumference side spare area size szOSA and the last spare area size szLSA are so set in physical formatting that the following condition is satisfied:

$$szOSA > szLSA + szFS.$$

In writing of the file system FS as file system initialization, the file system FS is written near the beginning and end of the logical address space.

Due to this scheme, the areas in the other layers overlapping with the area of the file system FS in the layer stacking direction are disposed outside the logical address space and used as areas in which stream data are not recorded.

Therefore, stream data recording in the state in which the laser light passes through the writing-completed area (file system area) in the recording layer L2 is avoided. Thus, the reliability of stream data recording can be enhanced.

As described above, because verify is not carried out in stream data recording, the possibility that the lowering of the recording quality causes even data loss is high. Therefore, permitting maintenance of high recording quality is very important for stream data recording.

In the case of the present example, the relationship represented by the following equation is set as is apparent from the diagram:

$$szOSA = szLSA + szFS + BA.$$

This "BA" is the size decided in consideration of eccentricity among the layers and defocus.

As described above, the groove patterns for forming the tracks in layers L0, L1, and L2 are each shaped by a corresponding one of the stampers at the time of the fabrication of the disk substrate 201 and at the time of the formation of the intermediate layer 204. Thus, it is difficult to make the center points of the groove patterns serving as the tracks completely match each other, and a predetermined tolerance is permitted.

For example, a maximum of 75 μm is permitted as the amount of eccentricity of each layer. Furthermore, as the radial position accuracy, a maximum of 100 μm in the absolute value is permitted.

In this case, the mutual positional offset among the respective recording layers is 175 μm in the worst case.

However, defocus needs to be also taken into consideration. Layer L2, which is the recording layer closest to the laser-incident surface in the triple-layer disk, is separate from layer L0 by a distance slightly shorter than 50 μm. Suppose that this distance is 46.5 μm for example. In this case, when recording to layer L0 is performed with focus on layer L0, the laser irradiation range of layer L2 is a range of radius 29 μm.

When these points are taken into consideration, the absence of a separation distance of about 200 μm or longer causes a possibility of the occurrence of a situation in which the area of the logical address space of layers L1 and L0 overlaps with the file system area of layer L2 in the layer stacking direction, i.e. stream data recording is performed by the laser light that has passed through the file system area.

To address this problem, depending on the permissible amount of eccentricity of each layer and defocus, the size BA is set. In addition, the outer circumference side spare area size szOSA and the last spare area size szLSA are set. For example the BA size is set to 200 μm or larger. This setting can prevent overlapping of the area of the file system FS and the logical address space even when eccentricity among the layers and defocus are taken into consideration.

That is, it is possible to surely prevent the situation in which stream data recording is performed by the laser light that has passed through the area of the file system FS.

FIG. 17B shows the case of a quadruple-layer disk. Also in the case of a quadruple-layer disk, in the respective layers L0, L1, L2, and L3, ISA (ISA0, ISA1, ISA2, and ISA3) is provided on the inner circumference side. Furthermore, OSA (OSA0, OSA1, OSA2, and OSA3) is provided on the outer circumference side.

In each of layers L0, L1, L2, and L3, stream data recording is performed along the direction of the arrowhead RS. Therefore, the last logical address is at the position on the outer circumference side of the ISA3 of layer L3.

In this case, the ISA3 serves as the LSA (last spare area).

The file system FS is recorded near the first logical address (FirstLSN) and near the last logical address (LastLSN) similarly to the case of a triple-layer disk. However, in this quadruple-layer disk, the last logical address (LastLSN) is at the position on the outer circumference side of the ISA3, and therefore the file system FS is recorded on the inner circumference side of layer L3.

In this case, attention should be paid to the area of the file system FS in layer L3, which is on the closest side from the viewpoint of the laser incidence side (file system area near the last logical address).

In layers L0, L1, and L2 different from layer L3, in which the area of the file system FS near the last logical address is disposed, the logical address space is not allocated to the areas overlapping with the area of this file system FS in the layer stacking direction.

Specifically, in this case, in layers L0, L1, and L2, ISA0, ISA1, and ISA2 are disposed as the areas overlapping with the area of this file system FS in the layer stacking direction.

This is realized by setting the size of the alternation areas (ISA0, ISA1, and ISA2) of layers L0, L1, and L2 larger than the total of the size of the ISA3 as the alternation area adjacent to the last logical address (LastLSN) and the size of the area of the file system FS.

The size of ISA0, ISA1, and ISA2 is prescribed by the value of the "inner circumference side spare area size" in the TDDS.

Because the ISA3 is the last spare area LSA, its size is prescribed by the value of the "last spare area size."

Therefore, if the inner circumference side spare area size is defined as szISA, the last spare area size is defined as szLSA, and the file system size is defined as szFS, the inner circumference side spare area size szISA and the last spare area size szLSA are so set in physical formatting that the following condition is satisfied:

$$szISA > szLSA + szFS.$$

In writing of the file system FS as file system initialization, the file system FS is written near the beginning and end of the logical address space.

Due to this scheme, the areas in the other layers overlapping with the area of the file system FS in the layer stacking direction are disposed outside the logical address space and used as areas in which stream data are not recorded.

Therefore, stream data recording in the state in which the laser light passes through the writing-completed area (file system area) in the recording layer L3 is avoided. Thus, the reliability of stream data recording can be enhanced.

Also in this case, the relationship represented by the following equation is set as is apparent from the diagram:

$$szISA = szLSA + szFS + BA.$$

Similarly to the case of the above-described triple-layer disk, depending on the amount of eccentricity of each layer, the size BA is set. In addition, the inner circumference side spare area size szISA and the last spare area size szLSA are set. This can prevent overlapping of the area of the file system FS and the logical address space even when eccentricity among the layers is present.

Also in the case of the quadruple-layer disk, no problem is caused when the size BA is set to 200 μm or larger, similarly to the triple-layer disk. However, in the case of the quadruple-layer disk, the maximum tolerance due to eccentricity among the layers and defocus can be considered as about 150 μm because of its specifications. Therefore, based on the premise that each layer does not involve an error of 150 μm or larger even in the worst case, the size BA is set to 150 μm or larger. This can prevent overlapping of the area of the file system FS and the logical address space irrespective of eccentricity among the layers and so forth.

A setting example of the specific spare area sizes in the case of triple-layer and quadruple-layer BD-R and BD-RE will be shown below.

First, the values based on the specifications of the triple-layer disk are as follows.

Track pitch: 0.32 μm
Channel bit length: 0.05587 μm
The number of channel bits/RUB: 962136 bits (RUB: Recording Unit Block)
Cluster length: 53754.54 μm The following values are calculated from these specification values.

Specifically, 625 is necessary as the number of tracks to ensure 200 μm as the above-described necessary BA size. In addition, at the subject radial position (58000 μm), 6.775986 clusters hold as the clusters/track.

From this, 4234.991 clusters are worked out as the necessary cluster difference as the size BA.

Moreover, it is enough that about 100 clusters are ensured as the file system area near the last logical address as described above.

Thus, the necessary cluster difference between OSA0 and OSA1 of layers L0 and L1 and LSA (OSA2) of layer L2 is 4234.991+100=4334.991 clusters.

Therefore, in the case of the triple-layer disk, it is sufficient that the spare area sizes allowing ensuring of this cluster difference are set.

As one example, the respective spare area sizes can be set as follows.

ISA size: 32×256 clusters
OSA size: 38×256 clusters
LSA size: 20×256 clusters

Setting such spare area sizes can realize the disk of FIG. 17A.

The values based on the specifications of the quadruple-layer disk are as follows.

Track pitch: 0.32 μm
Channel bit length: 0.05826 μm
The number of channel bits/RUB: 962136 bits
Cluster length: 56054.04 μm The following values are calculated from these specification values.

Specifically, 469 is necessary as the number of tracks to ensure 150 μm as the above-described necessary BA size. In addition, at the subject radial position (24000 μm), 2.688834 clusters hold as the clusters/track.

From this, 1260.391 clusters are worked out as the necessary cluster difference as the size BA.

Moreover, it is enough that about 100 clusters are ensured as the file system area near the last logical address as described above.

Thus, the necessary cluster difference between ISA0, ISA1, and ISA2 of layers L0, L1, and L2 and LSA (ISA3) of layer L3 is 1260.391+100=1360.391 clusters.

Therefore, in the case of the quadruple-layer disk, it is sufficient that the spare area sizes allowing ensuring of this cluster difference are set.

As one example, the respective spare area sizes can be set as follows.

ISA size: 32×256 clusters
OSA size: 34×256 clusters
LSA size: 24×256 clusters

Setting such spare area sizes can realize the disk of FIG. 17B.

Although the cases of the triple-layer disk and the quadruple-layer disk have been described above, it is obvious that the same concept can be applied also to the case of a disk having five or more layers.

That is, based on setting of the size of the spare areas on the inner circumference side or outer circumference side and the size of the last spare area in a multi-layer disk, an optical disk as the embodiment of the present invention can be realized.

Figure 18:
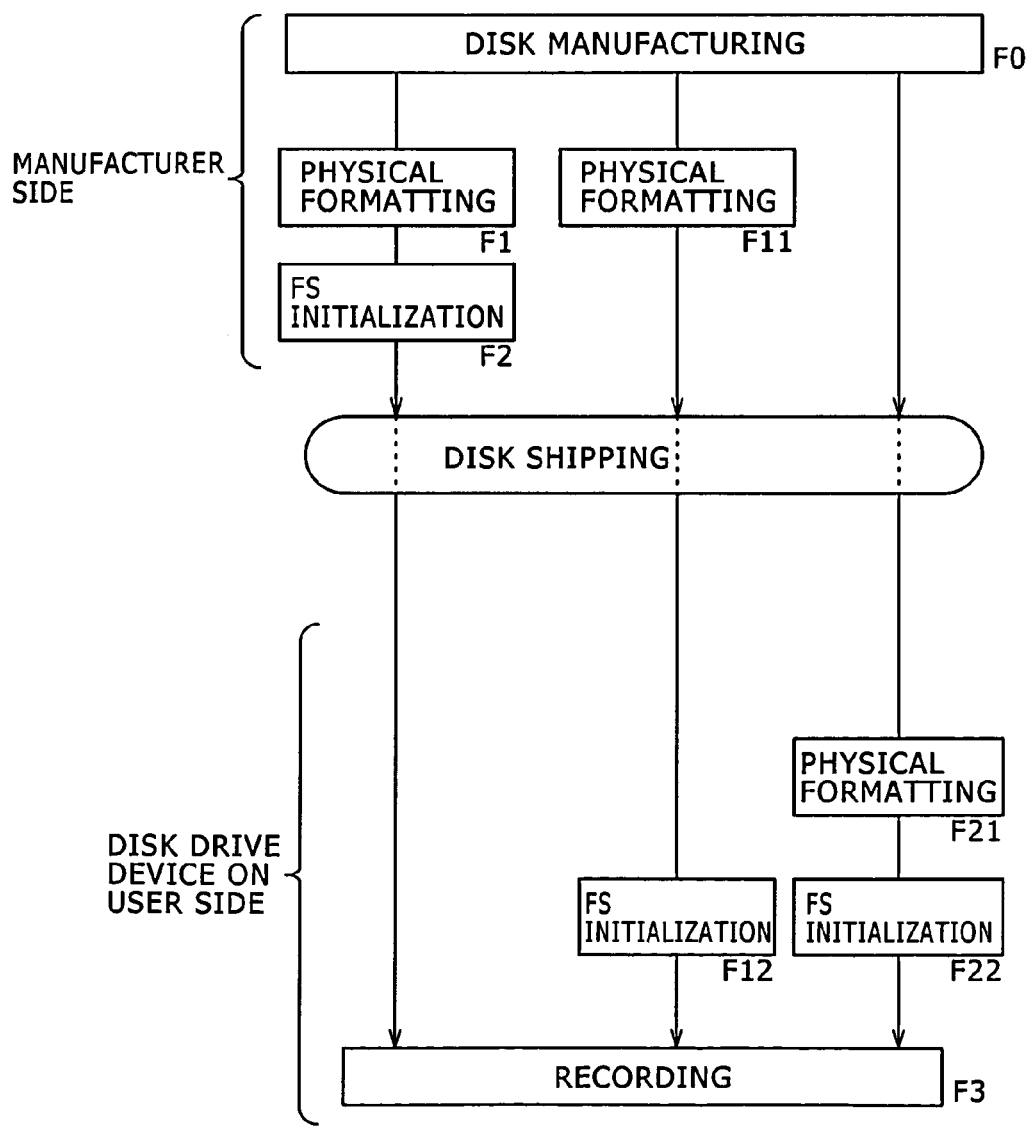
FIG. 18 shows a flow to recording of user data in the embodiment.

FIG. 18 shows the flow from disk manufacturing to recording of user data.

A step F0 shows a disk manufacturing step. As described above, the BD-R and the BD-RE as a triple-layer disk and a quadruple-layer disk are manufactured through the respective steps of substrate molding, production of the respective layers by use of a stamper, formation of a cover layer, and so forth.

The BD-R and BD-RE manufactured in the step F0 are a disk for which physical formatting and file system initialization have not been carried out.

In some cases, such a disk is shipped as it is. In other cases, the disk is shipped after being subjected to physical formatting and/or file system initialization.

Steps F1 and F2 show the case in which the disk is shipped after physical formatting is carried out by a disk drive device on the manufacturer side and file system initialization is also carried out.

The disk shipped through the steps F1 and F2 in this manner is in the state shown in FIGS. 17A and 17B.

The user who purchased this disk can immediately carry out user data recording as a step F3 by a disk drive device on the user side.

A step F11 shows the case in which the disk is shipped after physical formatting is carried out by the disk drive device on the manufacturer side.

The user who purchased this disk needs to first carry out file system initialization as a step F12 by the disk drive device on the user side. This makes the disk enter the state shown in FIGS. 17A and 17B. Thereafter, user data recording of the step F3 can be performed by the disk drive device on the user side.

If a disk is shipped without physical formatting on the manufacturer side, the user who purchased this disk carries out physical formatting of a step F21 and file system initialization of a step F22 by the disk drive device on the user side. This makes the disk enter the state shown in FIGS. 17A and 17B. Thereafter, user data recording of the step F3 can be performed by the disk drive device on the user side.

The process from disk manufacturing to user data recording is carried out through these various kinds of procedures for example.

Therefore, the disk as the embodiment of the present invention is realized at the stage of shipping from the manufacturer or at the stage of preparation before use on the user side.

Furthermore, the disk drive device on the manufacturer side or the disk drive device on the user side is equivalent to the disk drive device of the embodiment of the present invention.

In physical formatting by the disk drive device, information of the above-described TDMA (DMA, in the case of the BD-RE) is written to the disk. At this time, the sizes of the ISA, the OSA, and the LSA are set and written to the TDDS (or DDS) as described above with FIGS. 17A and 17B.

Thereafter, as file system initialization, the file system FS is written near the first logical address (FirstLSN) and near the last logical address (LastLSN).

Thereby, a disk like those of FIGS. 17A and 17B is realized.

In the disk of the present example, the areas in the other layers overlapping with the area of the file system FS in the layer stacking direction are disposed outside the logical address space and used as areas in which stream data are not recorded. Therefore, stream data recording in the state in which the laser light passes through the file system area is avoided. Thus, the reliability of stream data recording can be enhanced.

Furthermore, the present example is free from the need to discriminate between a triple-layer disk and a quadruple-layer disk as a matter of logic.

It is sufficient that a disk drive device carries out spare area arrangement one time in physical formatting of the disk, and the software to control the file system FS thereafter does not need to precisely know which position on the optical disk the logical address is disposed. That is, all the software has to do is execute the same processing of "disposing the small LSA" irrespective of the total number of times of recording.

Furthermore, in the case of the present example, reliability enhancement can be easily realized without using e.g. a technique of minutely cutting the track in the user area. This is an advantageous point over a modification example of FIG. 19A to be described later. The reason therefor will be described later.

[9. Modification Example]

Modification examples will be described below with use of FIGS. 19A and 19B.

Figure 19A:
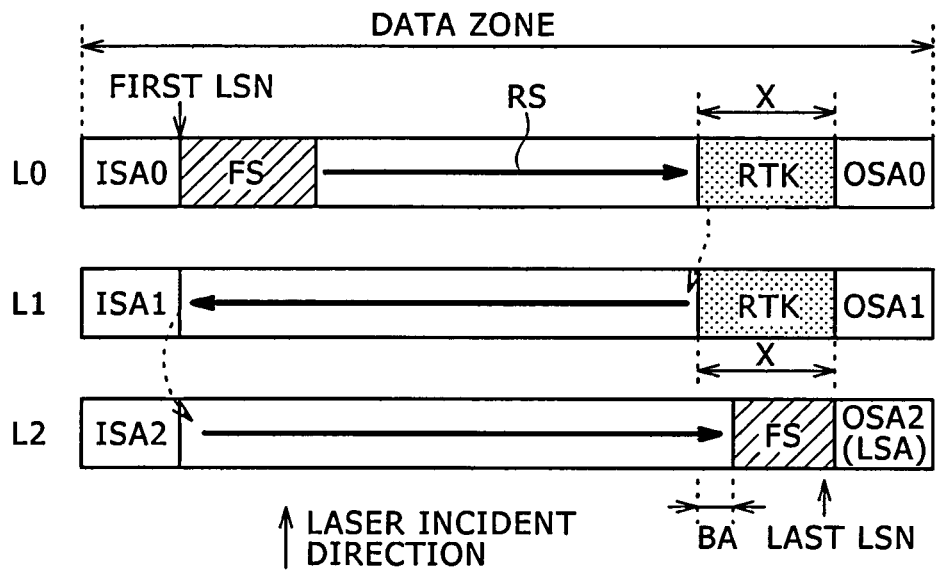
FIGS. 19A and 19B show structure examples of each of recording layers in a disk of another embodiment.

FIG. 19A shows an example in which, in a triple-layer disk, reserve tracks RTK are set at areas X including the parts overlapping with a file system FS in layers L0 and L1.

This reserve track RTK is defined as the area that is not used for stream data recording. That is, it is defined as the area that is not used at all.

Also by this scheme, the areas in the other layers overlapping with the area of the file system FS in the layer stacking direction are disposed as areas in which stream data are not recorded. Thus, the reliability of stream data recording can be enhanced.

This scheme can be applied also to a disk having four or more layers, of course.

In the case of a write-once medium, the reserve tracks RTK are set as shown in the diagram and are not used in writing of stream data.

In the case of a rewritable medium, the track does not need to be cut because random writing is possible, and it is possible to avoid use of the above-described areas in writing of stream data.

However, to carry out these kinds of control, the software to control the file system needs to precisely know which position on the optical disk the logical address is disposed. Furthermore, the software needs to decide the kind of control depending on minute physical information such as the number of layers.

In terms of this point, the above-described technique of FIGS. 17A and 17B is advantageous in that the technique can be easily realized without using e.g. the technique of minutely cutting the track in the user area.

Figure 19B:
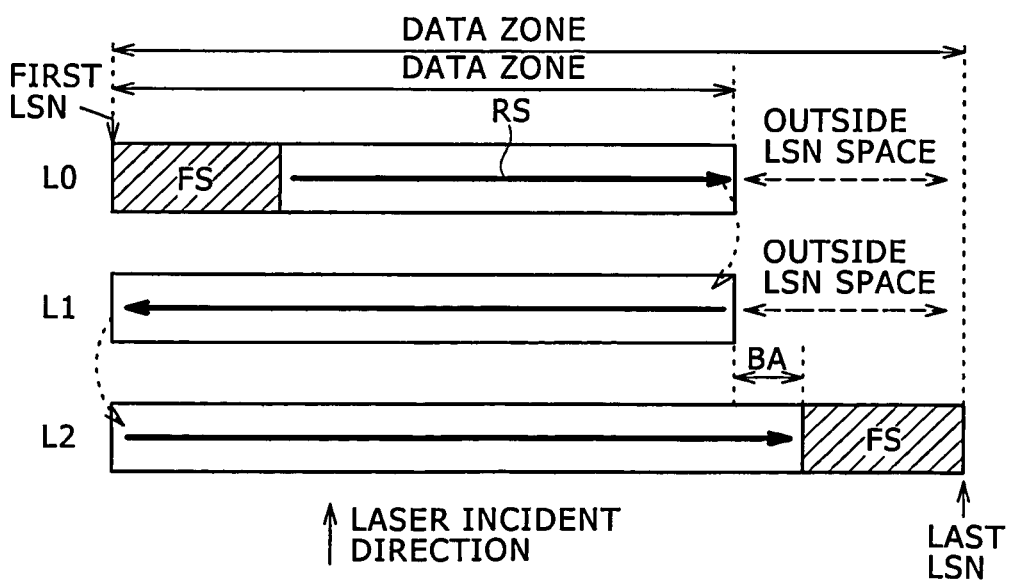
Figure 20A:
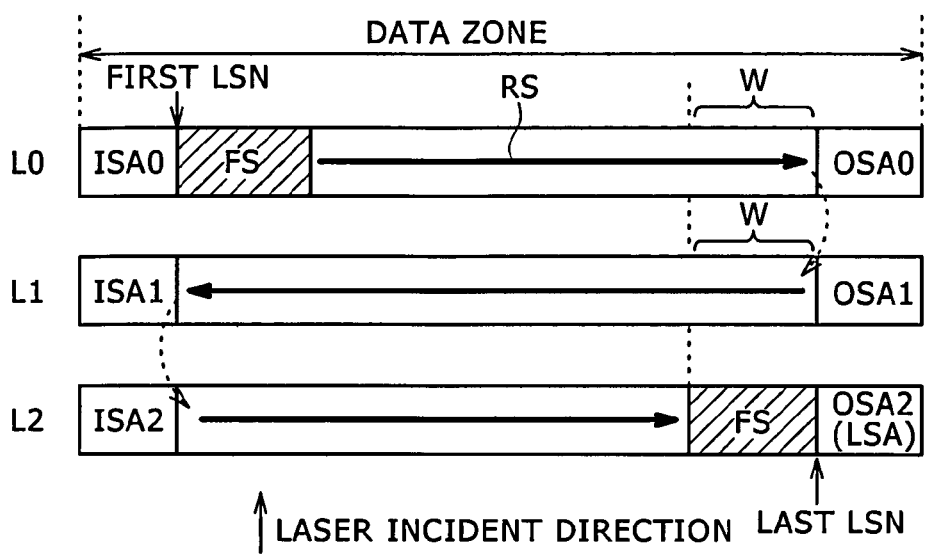
FIG. 20 shows a structure example of each of recording layers in a disk of related art.
Figure 20B:
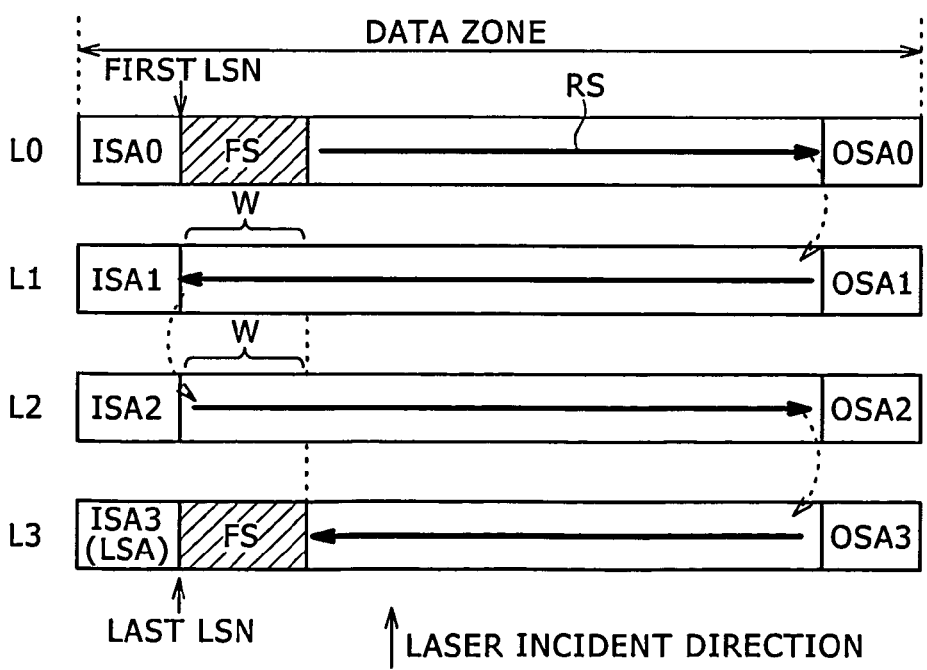

FIG. 19B shows another example in which, in a triple-layer disk, areas including the parts overlapping with the area of the file system FS in layers L0 and L1 are disposed outside the logical address space. That is, the logical address is not allocated to these areas, and as a result these areas are defined as the area that is not used for stream data recording.

Also by this scheme, the areas in the other layers overlapping with the area of the file system FS in the layer stacking direction are disposed as areas in which stream data are not recorded. Thus, the reliability of stream data recording can be enhanced.

This scheme can be applied also to a disk having four or more layers, of course.

The embodiment of the present invention can be realized also when the spare areas such as the ISA and the OSA do not exist (are not provided) like in this example.

The disk of the embodiment of the present invention and the disk drive device capable of dealing with the disk have been described above. However, the present invention is not limited to these examples but various modification examples may be made without departing from the scope of the present invention.

It should be understood by those skilled in the art that various modifications, combinations, sub-combinations and alternations may occur depending on design requirements and other factors insofar as they are within the scope of the appended claims or the equivalent thereof.

What is claimed is:

1. A multi-layer optical recording medium having n recording layers (n≥3) in which recording and reproduction of information are carried out by laser light, the multi-layer optical recording medium comprising:
a first file system area configured to be disposed in a first recording layer near a first logical address in an area used as a logical address space in which user data is recorded; and
a second file system area configured to be disposed in the n-th recording layer near a last logical address in an area used as the logical address space,
wherein the first file system area and the second file system area are reserved for recording of a file system which occurs prior to recording of the user data,
wherein the first recording layer is a furthest layer from a viewpoint of a laser light incident surface side, and the n-th recording layer is a closest layer to the laser light incident surface side,
wherein the logical address space is formed from the first logical address in the first recording layer to the last logical address in the n-th recording layer, and
wherein (i) in the other recording layers different from the recording layer in which the second file system area is disposed, the logical address space is not allocated to an area overlapping with the second file system area in a layer stacking direction, and (ii) in the first recording layer the first file system area is disposed so as to overlap the logical address space in all other recording layers in the layer stacking direction.

2. The multi-layer optical recording medium according to claim 1, wherein
an alternation area is formed physically adjacent to the area used as the logical address space in each of the recording layers, and
the alternation area is disposed as the areas in the other recording layers overlapping with the second file system area in the layer stacking direction.

3. The multi-layer optical recording medium according to claim 2, wherein size of the alternation areas in the other recording layers is set larger than at least a total of size of the alternation area adjacent to the last logical address and size of the second file system area, to dispose the alternation area as the areas in the other recording layers overlapping with the second file system area in the layer stacking direction.

4. A recording device for a multi-layer optical recording medium having n recording layers (n≥3) in which recording and reproduction of information are carried out by laser light, the recording device comprising:
a recorder configured to carry out information recording by irradiating the recording layers of the multi-layer optical recording medium with laser light; and
a controller configured to execute processing of making the recorder record, in the multi-layer optical recording medium, management information for setting size of an alternation area adjacent to a last logical address and size of alternation areas in the other recording layers overlapping with the alternation area adjacent to the last logical address in a layer stacking direction in such a manner that the size of the alternation areas in the other recording layers is set larger than at least a total of the size of the alternation area adjacent to the last logical address and size of a file system area formed near the last logical address in setting of the alternation areas adjacent to an area used as a logical address space in the recording layers as physical formatting processing for the multi-layer optical recording medium,
in which the alternation area adjacent to the last logical address and each of the alternation areas in the other recording layers are outer spare areas, such that the size of each outer spare area in the other recording layers is set larger than the total size of the outer spare area adjacent to the last logical address and the file system area formed near the last logical address.

5. The recording device according to claim 4, wherein the controller makes the recorder form a file system area near a first logical address of the logical address space and near the last logical address as file system initialization after the physical formatting, to thereby allow the alternation areas in the other recording layers to overlap with the file system area near the last logical address in the layer stacking direction.

6. The recording device according to claim 5, wherein the controller controls the recorder so that stream data is recorded in the area used as the logical address space in the multi-layer optical recording medium after the file system initialization.

7. The recording device according to claim 6, wherein
in the multi-layer optical recording medium, a first recording layer is formed at a remotest position from a viewpoint of a laser light incident surface side and the recording layers from a second recording layer to an n-th recording layer are so formed as to be sequentially closer to the laser light incident surface side, and the logical address space is formed as an area from the first logical address in the first recording layer to the last logical address in the n-th recording layer, and
the controller carries out control to make the recorder record stream data in the area used as the logical address space in order from the first recording layer to the n-th recording layer.

8. A recording device for a multi-layer optical recording medium having n recording layers (n≥3) in which recording and reproduction of information are carried out by laser light, the recording device comprising:
a recorder configured to carry out information recording by irradiating the recording layers of the multi-layer optical recording medium with laser light; and
a controller configured to execute processing of making the recorder form a file system area near a first logical address of a logical address space and near a last logical address as file system initialization for the multi-layer optical recording medium in which size of an alternation area adjacent to the last logical address and size of alternation areas in the other recording layers overlapping with the alternation area adjacent to the last logical address in a layer stacking direction are set in such a manner that the size of the alternation areas in the other recording layers is set larger than at least a total of the size of the alternation area adjacent to the last logical address and size of the file system area formed near the last logical address in setting of the alternation areas adjacent to an area used as the logical address space in the recording layers as physical formatting processing for the multi-layer optical recording medium, to thereby allow the alternation areas in the other recording layers to overlap with the file system area near the last logical address in the layer stacking direction,
in which the alternation area adjacent to the last logical address and each of the alternation areas in the other recording layers are outer spare areas, such that the size of each outer spare area in the other recording layers is set larger than the total size of the outer spare area adjacent to the last logical address and the file system area formed near the last logical address.

9. The recording device according to claim 8, wherein
in the multi-layer optical recording medium, a first recording layer is formed at a remotest position from a viewpoint of a laser light incident surface side and the recording layers from a second recording layer to an n-th recording layer are so formed as to be sequentially closer to the laser light incident surface side, and the logical address space is formed as an area from the first logical address in the first recording layer to the last logical address in the n-th recording layer, and the controller carries out control to make the recorder record stream data in the area used as the logical address space in order from the first recording layer to the n-th recording layer.

10. A recording method for a multi-layer optical recording medium having n recording layers (n≥3) in which recording and reproduction of information are carried out by laser light, the recording method comprising the steps of:
setting size of an alternation area adjacent to a last logical address and size of alternation areas in the other recording layers overlapping with the alternation area adjacent to the last logical address in a layer stacking direction in such a manner that the size of the alternation areas in the other recording layers is set larger than at least a total of the size of the alternation area adjacent to the last logical address and size of a file system area formed near the last logical address in setting of the alternation areas adjacent to an area used as a logical address space in the recording layers at a stage of physical formatting for the multi-layer optical recording medium;
forming a file system area near a first logical address of the logical address space and near the last logical address as file system initialization after the physical formatting, to allow the alternation areas in the other recording layers to overlap with the file system area near the last logical address in the layer stacking direction; and
recording stream data in the area used as the logical address space in the multi-layer optical recording medium after the file system initialization,
in which the alternation area adjacent to the last logical address and each of the alternation areas in the other recording layers are outer spare areas, such that the size of each outer spare area in the other recording layers is set larger than the total size of the outer spare area adjacent to the last logical address and the file system area formed near the last logical address.

11. A recording device for a multi-layer optical recording medium having n recording layers (n≥3) in which recording and reproduction of information are carried out by laser light, the recording device comprising:
recording means for carrying out information recording by irradiating the recording layers of the multi-layer optical recording medium with laser light; and
controlling means executing processing of making the recording means record, in the multi-layer optical recording medium, management information for setting size of an alternation area adjacent to a last logical address and size of alternation areas in the other recording layers overlapping with the alternation area adjacent to the last logical address in a layer stacking direction in such a manner that the size of the alternation areas in the other recording layers is set larger than at least a total of the size of the alternation area adjacent to the last logical address and size of a file system area formed near the last logical address in setting of the alternation areas adjacent to an area used as a logical address space in the recording layers as physical formatting processing for the multi-layer optical recording medium,
in which the alternation area adjacent to the last logical address and each of the alternation areas in the other recording layers are outer spare areas, such that the size of each outer spare area in the other recording layers is set larger than the total size of the outer spare area adjacent to the last logical address and the file system area formed near the last logical address.

12. A recording device for a multi-layer optical recording medium having n recording layers (n≥3) in which recording and reproduction of information are carried out by laser light, the recording device comprising:

recording means for carrying out information recording by irradiating the recording layers of the multi-layer optical recording medium with laser light; and controlling means for executing processing of making the recording means form a file system area near a first logical address of a logical address space and near a last logical address as file system initialization for the multi-layer optical recording medium in which size of an alternation area adjacent to the last logical address and size of alternation areas in the other recording layers overlapping with the alternation area adjacent to the last logical address in a layer stacking direction are set in such a manner that the size of the alternation areas in the other recording layers is set larger than at least a total of the size of the alternation area adjacent to the last logical address and size of the file system area formed near the last logical address in setting of the alternation areas adjacent to an area used as the logical address space in the recording layers as physical formatting processing for the multi-layer optical recording medium, to allow the alternation areas in the other recording layers to overlap with the file system area near the last logical address in the layer stacking direction, in which the alternation area adjacent to the last logical address and each of the alternation areas in the other recording layers are outer spare areas, such that the size of each outer spare area in the other recording layers is set larger than the total size of the outer spare area adjacent to the last logical address and the file system area formed near the last logical address.

* * * * *